(12) United States Patent
Parrella

(10) Patent No.: US 12,271,950 B2
(45) Date of Patent: Apr. 8, 2025

(54) SCORING AND RECOMMENDATION SYSTEM, METHOD AND PROGRAM PRODUCT FOR QUANTITATIVE TRADING STRATEGIES

(71) Applicant: Francesco Parrella, London (GB)

(72) Inventor: Francesco Parrella, London (GB)

( * ) Notice: Subject to any disclaimer, the term of this patent is extended or adjusted under 35 U.S.C. 154(b) by 0 days.

(21) Appl. No.: 18/825,763

(22) Filed: Sep. 5, 2024

(65) Prior Publication Data

US 2025/0086713 A1     Mar. 13, 2025

Related U.S. Application Data

(60) Provisional application No. 63/581,252, filed on Sep. 7, 2023.

(51) Int. Cl.
*G06Q 40/04* (2012.01)

(52) U.S. Cl.
CPC .................. *G06Q 40/04* (2013.01)

(58) Field of Classification Search
CPC ...................................... G06Q 40/04
See application file for complete search history.

(56) References Cited

U.S. PATENT DOCUMENTS

| 7,373,324 B1 * | 5/2008 | Engin | G06Q 40/00 705/37 |
| 7,979,335 B2 | 7/2011 | Schneider | |
| 2005/0102220 A1 | 5/2005 | Stackpole | |
| 2011/0112983 A1 * | 5/2011 | Wu | G06Q 40/06 705/36 R |
| 2014/0236796 A1 | 8/2014 | Colon Bolea et al. | |

FOREIGN PATENT DOCUMENTS

| GB | 2417796 A | * | 3/2006 | ............. G06Q 40/04 |
| JP | 2016535914 A | * | 11/2016 | ............. G06Q 40/04 |

OTHER PUBLICATIONS

Li et al.: Optimization of Investment Strategies Through Machine Learning, May 2023, Heliyon, 9, e16155, pp. 1-10 (Year: 2023).*

(Continued)

*Primary Examiner* — Bijendra K Shrestha
(74) *Attorney, Agent, or Firm* — Ariel S. Bentolila; Bay Area IP Group

(57) ABSTRACT

A method, system and program product including receiving data, including historical prices, volumes, and trading strategy model parameters; executing at least one of an analysis, performance testing and scoring of the trading strategy model's process; performing a series of trading strategy model calculations including a Sharpe ratio score calculation that compares performances of different trading strategy models; analyzing the performance of the trading strategy model by running different combinations of the trading strategy model parameters; detecting overfitting; implementing a distribution of said input data to said analysis, Strategy Stats Calculation, and/or All-Parameters Analysis modules; calculating a score of an overall performance of the trading strategy model by normalizing single scores and combining the single scores into groups; implementing a distribution at least one of, score calculations, analysis data, and recommendations to said output module.

17 Claims, 18 Drawing Sheets

(56) References Cited

OTHER PUBLICATIONS

Longmore, Kris: Parameter Optimisation for Systematic Trading, Apr. 19, 2020, pp. 1-20 (Year: 2020).*
Hasan et al.: Modeling Traders' Behavior with Deep Learning and Machine Learning Methods: Evidence from BIST 100 Index, Jun. 29, 2020, Hindawi Complexity, vol. 2020, Article ID 8285149, pp. 1-26 (Year: 2020).*

* cited by examiner

FIG. 5

SCORING AND RECOMMENDATION SYSTEM, METHOD AND PROGRAM PRODUCT FOR QUANTITATIVE TRADING STRATEGIES

CROSS-REFERENCE TO RELATED APPLICATIONS

The present Utility patent application claims priority benefit of the [U.S. provisional application for patent Ser. No. 63/581,252 entitled "SCORING AND RECOMMENDATION SYSTEM AND METHODS FOR QUANTITATIVE TRADINGSTRATEGIES", filed on Sep. 7, 2023] under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to system and methods for evaluating investment trading strategies. More particularly, certain embodiments of the invention relate to systems and methods for quantitative trading strategy models.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that quantitative trading strategies play a significant role in today's financial markets. Typical algorithms leverage mathematical models and statistical techniques to sift through financial data, aiming to forecast future price movements. Such strategies may encompass various approaches, including but not limited to mean reversion, trend following, pairs trading, statistical arbitrage, and machine learning strategies.

Despite the algorithms pervasive usage, assessing the performance of quantitative strategies poses a notable challenge due to the lack of a universally effective metric. Existing metrics like the Sharpe Ratio, a prominent tool in this arena, have recognized limitations. For example, it doesn't take into account the non-normality of return distributions and may misinterpret risk.

A widespread issue of conventional performance evaluation hinders the correct assessment of quantitative strategies, thus hampering the potential growth of financial portfolios. Therefore, a need exists for a more comprehensive and robust methodology to evaluate the efficacy of typical strategies accurately. In addition, a need exists of a new approach that is designed to overcome the common pitfalls which several trading strategies are affected by. Moreover, a need exists for a more accurate, effective, and reliable assessment of quantitative strategies, contributing to the advancement of financial algorithmic trading.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is an illustration of an exemplary Score Board, in accordance with an embodiment of the present invention;

Figure 1:
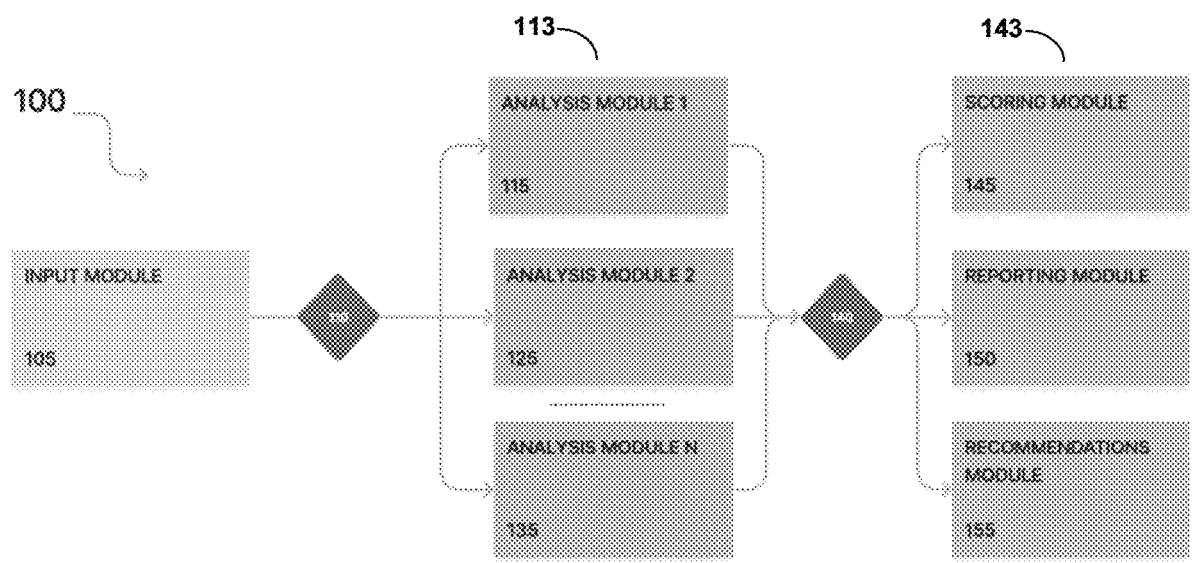
FIG. 1 is an illustration of an exemplary Scoring and Recommendation System Framework model, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Overfitting—is when a model is excessively complex and tailored too precisely to past data, capturing noise along with underlying pattern(s). Overfit models tend to perform poorly on new, unseen data because they're too specialized in the data they were trained on.

Change in market conditions—Quantitative models are generally built on historical data. If the market conditions change drastically, which they often do, the model may not perform as expected. Market condition changes may include changes in economic conditions, market volatility, liquidity conditions, and even regulatory changes.

Model risk—is a risk that the model itself could be incorrect or based on inaccurate assumptions such as, not a limitation, both model structure and data feeding into the model.

Data snooping bias—may occur when a strategy is chosen based on model performance with a specific set of data, ignoring the fact that the model may not perform as well with other data sets.

Parameter uncertainty—Quantitative strategies often involve the use of parameters that may need to be estimated. If the parameter estimates are incorrect, the strategy model may not perform as expected.

Lack of adaptability—Markets evolve over time. If the quantitative strategy model doesn't adapt to market changes, the strategy model could become outdated and less effective.

Sensitivity Analysis—a sensitivity analysis for each parameter may optimize the trading strategy model and may allow to focus more on the most influential parameters that have a significant impact on the performance. To study the variability for a given parameter, the value of one parameter may be changed and default values may be used for the remaining parameters. A number of variations may be proximately equal to the number of values for the considered parameter. Then, a score may be defined as the difference between a highest and lowest Sharpe Ratio. The score may be calculated for each parameter.

Walk-forward optimization—a process for testing the trading strategy model by finding optimal trading parameters (e.g. in-sample or training data) in a certain time period and checking the performance of trading parameters (e.g. out-of-sample or testing data) in the given time period. The learning model may be used to validate and optimize the trading strategy model by iteratively testing the strategy model after each period. For example, at a time period t, performances for all simulations may be used to choose one value for each parameter (e.g. in-sample or training data optimization). Then, the variation with the values may be used to determine a performance at a time period t+1 (e.g. out-of-sample or testing data). The process is repeated after each time period. Finally, the learning model performance may be constructed from the output of the testing process.

Slippage Costs—are calculated as the difference between an intended price and an actual price at which the trade is executed in the market. A bid/ask spread is the main factor that may determine slippage costs for a given financial asset. Similar to the commission costs, slippage costs may significantly affect the performance of a given trading strategy model.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term [" substantially "] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearward most point of the upper or outsole.

Similarly, the term 'substantially' is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W] e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit —"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them-Such terms are open-ended and mean "including but not limited to". When employed in the appended claims, this term does not foreclose additional structure or steps. Consider a claim that recites: "A memory controller comprising a system cache . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform (ing) one or more tasks is expressly intended not to invoke 35 U.S.C. sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus, in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112 (6) (post AIA 112 (f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components is described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems or framework that are capable of accepting a structured input, processing the structured input according to prescribed rules, and producing results of the processing as output in accordance with a quantitative trading strategy model embodiment of the present invention. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules including, not a limitation, test modules for measuring performances of trading strategy models may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

While embodiments herein may be discussed in terms of a processor having a certain number of bit instructions/data, those skilled in the art will know others that may be suitable such as 16 bits, 32 bits, 64 bits, 128s or 256-bit processors or processing, which may usually alternatively be used. Where a specified logical sense is used, the opposite logical sense is also intended to be encompassed.

The example quantitative trading strategy model embodiments described herein may be implemented in an operating environment comprising computer-executable instructions (e.g., software) installed on a computer, in hardware, or in a combination of software and hardware. The computer-executable instructions may be written in a computer programming language or may be embodied in firmware logic. If written in a programming language conforming to a recognized standard, such instructions may be executed on a variety of hardware platforms and for interfaces to a variety of operating systems. Although not limited thereto, computer software program code for carrying out operations for aspects of the present invention may be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini.™., C, C++, Smalltalk, Perl, Python, UNIX Shell, Visual Basic or Visual Basic Script, Virtual Reality Markup Language (VRML), ColdFusion™ or other compilers, assemblers, interpreters or other computer languages or platforms.

The system proposed may run in any hardware which can execute a Touring-complete programming language. Examples of Touring-complete machines are, but not limited to, computers, servers, mobile phones, quantum computers.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code of the quantitative trading strategy model may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart or workflow illustrations and/or block diagrams of methods, apparatus (systems) and computer program products according to embodiments of the invention. It will be understood that each block of the workflow illustrations and/or block diagrams, and combinations of blocks in the flowchart or workflow illustrations and/or block diagrams, may be implemented by computer program instructions. The computer program instructions of the quantitative trading strategy system and method may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart or workflow and block diagrams in the figures illustrate the architecture, functionality, and operation of possible implementations of systems, methods and computer program products according to various embodiments. In this regard, each block in the flowchart/workflow or block diagrams may represent a module, segment, or portion of code, which comprises one or more executable instructions for implementing the specified logical function(s). It should also be noted that, in some alternative implementations, the functions noted in the block or module may occur out of the order noted in the figures. For example, two modules shown in succession may, in fact, be executed substantially concurrently, or the modules may sometimes be executed in the reverse order, depending upon the functionality involved. It will also be noted that each module of the block diagrams and/or flowchart/workflow illustration, and combinations of modules in the block diagrams and/or flowchart illustration, may be implemented by special purpose hardware-based systems that perform computer instructions of the specified functions or acts, or combinations of special purpose hardware and computer instructions.

The computer program instructions including the quantitative trading strategy model software product may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart/workflow and/or block diagram module or modules.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries may be different from those illustrated herein. Further, despite any depiction of the databases as tables, an object-based model could be used to store and manipulate the data types or parameters of the present invention and likewise, object methods or behaviors may be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that may access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM.RTM. MQSeries.RTM. technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the quantitative trading operations disclosed herein. An apparatus may be specially constructed for the desired purposes of quantitative trading strategy modeling, or it may comprise a general-purpose device selectively activated or reconfigured by a program stored in the device.

Embodiments of the quantitative trading strategy model invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the quantitative trading strategy model invention may be embodied as a system, method or computer program product. Accordingly, aspects of the quantitative trading strategy model invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the quantitative trading strategy model invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" may include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the quantitative trading strategy model disclosure may also include tangible and/or non-transitory computer-readable storage media for carrying or having computer-executable instructions or data structures stored thereon. Such non-transitory computer-readable storage media may be any available media that may be accessed by a general purpose or special purpose computer, including the functional design of any special purpose processor as discussed above. By way of example, and not limitation, such non-transitory computer-readable media may include RAM, ROM, EEPROM, CD-ROM or other optical disk storage, magnetic disk storage or other magnetic storage devices, or any other medium which may be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium may include, but is not limited to, a hard drive, compact disc, flash memory, volatile memory, random access memory, magnetic memory, optical memory, semiconductor-based memory, phase change memory, periodically refreshed memory, quantum memory, and the like; the non-transitory computer readable medium, however, does not include a pure transitory signal per se; i.e., where the medium itself is transitory.

Through the execution of sets of unique independent tests, the framework, platform or system and method may critically assess various facets of the trading strategy model. A quantitative strategy may include a function that gives recommendation on what to trade (e.g. buy 200 shares of Apple). Subsequently, a performance score may be computed for each evaluated aspect. The scoring & recommendation system may detect flaws, analyzes overfitting, etc. If a particular score fails to meet predefined expectations, the system may proactively generate a strategic recommendation(s) for performance enhancement. The system generated recommendation(s) may be displayed on screen for a user to act upon.

Moreover, an aggregated global or overall score is derived, signifying the holistic performance of the strategy model. Owing to inherent flexibility, the proposed framework, platform or system and method effortlessly accommodate a diverse range of tests, thereby demonstrating system and method adaptability across different trading strategy models and market scenarios. The innovative approach aims to bring strategic improvements to a quantitative trading strategy model and may maximize potential profits and minimize risks.

A quantitative trading strategy may be defined as a mathematical function, in which inputs may include financial data such as, not a limitation, historical prices, volumes, etc. and various model parameters and an output of a testing and recommendation module may be characterized with a list of desired instrument positions or trades.

For example, a simple trend following strategy on the S&P 500 ETF, may be implemented as:

$$f(Prices)=Floor(Sign(Prices-MovingAverage(Prices[-252days:today]))*Capital/Prices)$$

The strategy may take in input daily prices, that the strategy compares each day prices with the moving average of the last year. And base on that it goes long (if positive) or short (if negative). The position size is calculated based on the capital available and floored to whole number, so that it may be traded.

Historical simulations may offer a viable means to back test the trading strategy model across a selected timeframe. The process may involve calculating the strategy's desired positions for each time period within a simulation period. Back testing a trading strategy model may provide a good understanding of what happened in the past, but may not predict a future of the model. Walk forward optimization may be utilized to forecast the future of the model. Walk-forward analysis may measure a quality of the strategy model instead of being used for finding the optimal parameters of the strategy model.

Once desired positions may be ascertained, determining a strategy model's profit and losses, among other key metrics, may be feasible. The metrics may provide valuable insight into the strategy model's potential profitability and associated risks.

In order to ensure that a simulation will also perform well when traded live, considering and factoring in several additional aspects may be crucial. The additional aspects may include but are not limited to transaction costs, slippage costs, market impact costs, the potential for look-ahead bias and survivorship bias, and trading volumes of instruments utilized within the simulation.

When provided with a trading strategy model and a corresponding list of desired positions, computing numerous performance metrics for the purpose of strategy model evaluation may be feasible. No singular measure of performance may be sufficient to confidently predict a strategy model's future profitability. The uncertainty arises from a multitude of factors, which may include, not a limitation, Overfitting, Change in market conditions, Model risk, Data snooping bias, Parameter uncertainty, and Lack of adaptability.

The system and method aim to identify potential shortcomings and provide support to users in circumventing the shortcomings, where feasible. Acknowledging and proactively managing potential pitfalls could enhance an efficacy of quantitative strategy model(s). Recognizing that no individual performance measure is sufficient in itself, the system and method leverages a multifaceted approach. The strategic trading system model analyzes a variety of metrics and integrates the metrics into a comprehensive grid of performance test scores and predetermined recommendations based on the value of the test scores.

In some embodiment, the strategic trading system and method or model may include an organized categorization of various performance tests/measures. The strength of the strategic trading system and method may not rest solely on any individual performance test and/or measure. Rather, the strategic trading system and method core contribution lies in the comprehensive framework or platform that assimilates all the various performance tests and/or measures, thereby providing a more accurate and robust understanding of genuine risks and profitability inherent in the quantitative trading strategy model. For each performance test, the methodology behind the strategy model's calculation is elucidated and actionable recommendations may be offered to the user should the resultant performance test score fall short of an ideal or acceptable value. A dual-faceted approach to each performance test enhances an overall utility and usability of the strategic trading system and method, and in turn, empowers the user with necessary insights to effectively optimize the strategic trading model.

The present invention will now be described in detail with reference to embodiments thereof as illustrated in the accompanying drawings.

FIG. 1 is an illustration of an exemplary Scoring and Recommendation System Framework model, in accordance with an embodiment of the present invention. In one embodiment of the present invention, a quantitative trading strategy workflow modules of the system/framework 100 is shown for correctly evaluating a trading strategy, selecting a trading strategy, etc. and may comprise, not a limitation, a system input module 105, a system data connector 110, a list of system analysis, performance testing, and/or scoring modules 113 in which the analysis of the trading strategy is performed (115-135). List of system analysis, performance testing, and/or scoring modules 113 may include, not a limitation, analysis module 1 115, analysis module 2 125, up to analysis module N 135. A system data connector 140 connects analysis modules 113 to a system output 143. The output of the system 143 may, include, not a limitation, a scoring module 145 which shows the scores of the related strategy, a reporting module 150 which shows more detailed information about the analysis, and a recommendation module 155 which suggests the user how to improve the strategy.

Input module 105 may include, not a limitation, a keyboard, a microphone, a memory/database, a camera, a mouse, etc. System data connector 110 140 may include, not a limitation, multiplexers, demultiplexers, data selectors, parallel to serial converter, many to one circuit, universal logic circuit, etc.

The strength of the system framework model may not rest solely on any individual performance test/measure. The core contribution lies in a comprehensive system framework that assimilates all the tests and/or measures, thereby providing a more accurate and robust understanding of genuine risks and profitability inherent in a quantitative trading strategy model.

Figure 2:
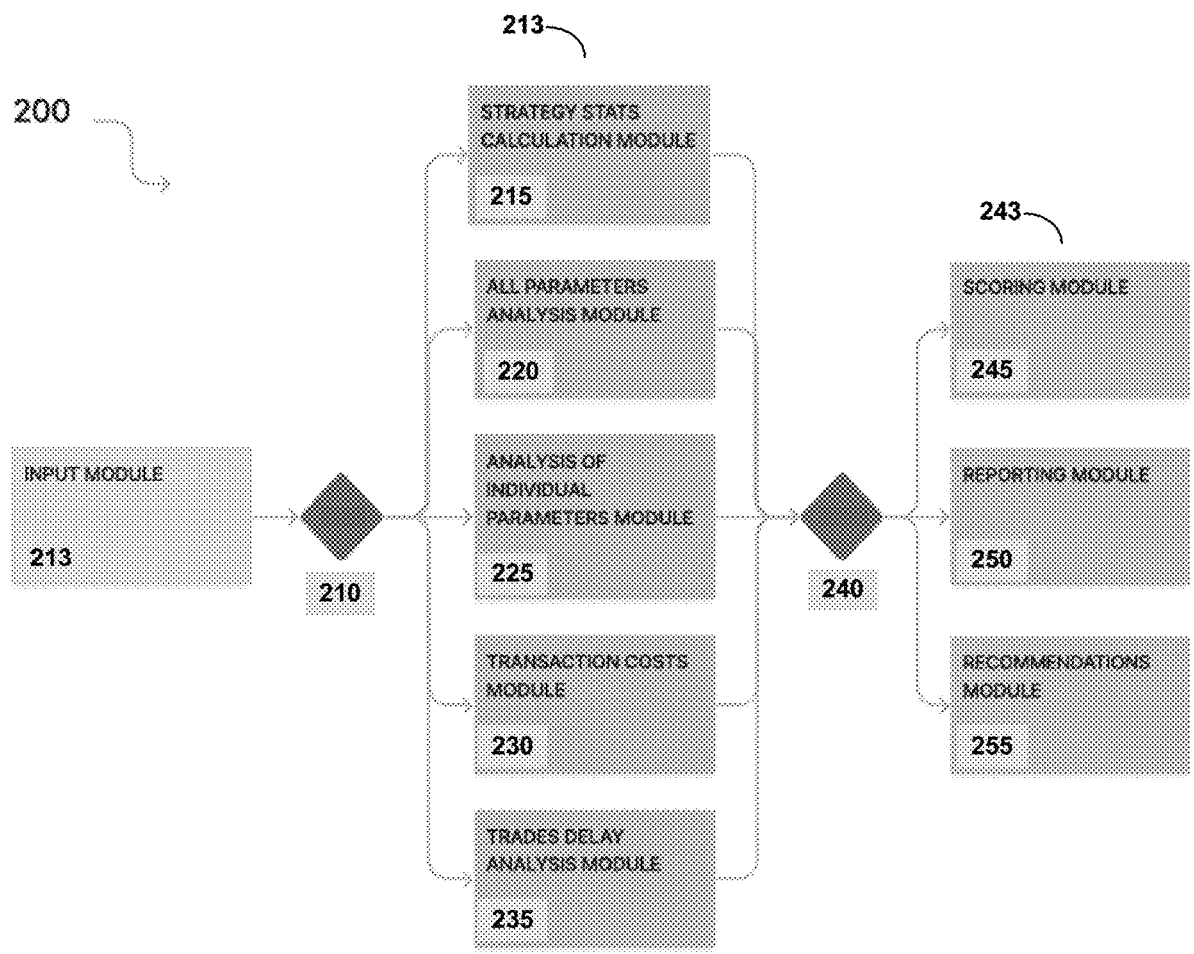
FIG. 2 is an illustration of an exemplary Scoring and Recommendation System, in accordance with an embodiment of the present invention.
Figure 3:
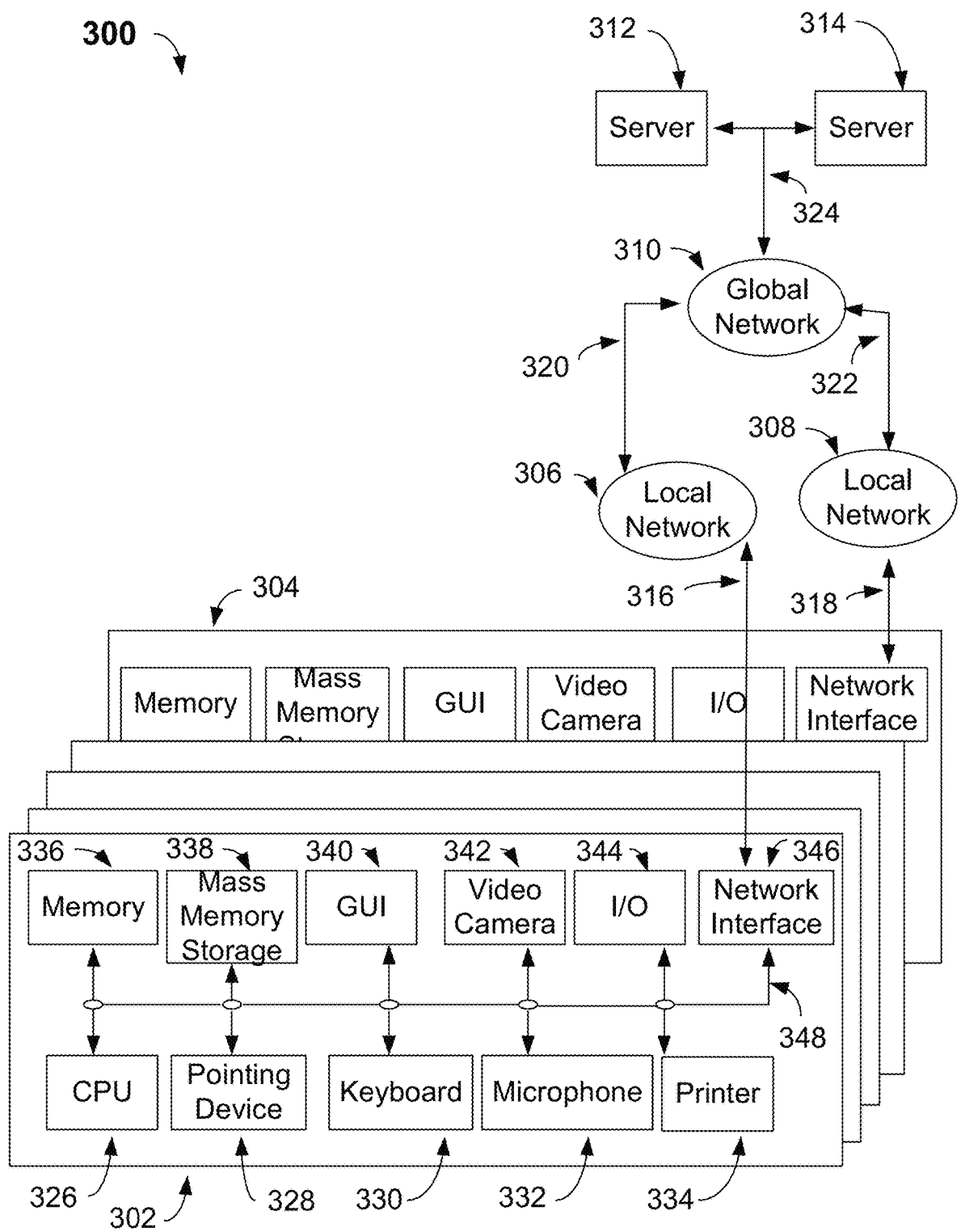
FIG. 3 is a block diagram depicting an exemplary client/server system which may be used by an exemplary client/server system embodiment of the present invention.

FIG. 2 is an illustration of an exemplary Scoring and Recommendation System, in accordance with an embodiment of the present invention. The figure shows an example of a comprehensive system architecture 200 of a trading strategy model. This example will be used to explain in detail the inputs of the system, some examples of system analysis performed, and what output is generated from the system analysis. Referring to FIG. 2 and FIG. 3, system input module 205 may include, not a limitation, a keyboard 330, a microphone 332, a memory/database 336, 338 for receiving and storing input data including financial data such as historical prices, volumes, trading strategy model parameters 1–N where N is any number starting from or ending at 2, etc. Input Module 205 data may include, not a limitation:

1. Capital to invest in the strategy (e.g. 100,000,000$)
2. If the strategy is long only, long/short, or short only (e.g. long only)
3. Which financial instruments should the strategy trade (e.g. SPY ETF, ES Future, etc.)
4. Benchmark of the strategy (e.g. S&P 500 Index)
5. Entry rules (e.g. MovingAverage (X)>MovingAverage (Y)
   X: number of days. Default=250, other values=150, 400
   Y: number of days. Default=50, other values=25, 100
6. Entry rules (e.g. MovingAverage (X)<MovingAverage (Y)
   X: number of days. Default=250, other values=150, 400
   Y: number of days. Default=50, other values=25, 100
7. Risk Management Settings (e.g. max allocation per instrument 10,000,000$, max volatility per instrument 5%, max volatility of the portfolio 10%).

When the parameters of the trading strategy model are inserted, the input module has insert default data values stored in memory (e.g. the ones a user thinks are the best) and other reasonable data values that make sense for the trading strategy. Other data values may be used for testing a sensitivity and the learning of the trading strategy model parameters. A "default strategy" model is a model that may use default parameters.

System input data connector 210 such as, not a limitation, input/output interface 344 distributes the input data among various system analysis, performance testing, and/or scoring modules 213. The distribution of the input data may be implemented in several ways, for example, not a limitation, via the database/memory which stores all the input data information and distributed to the various system analysis, performance testing, and/or scoring modules such as a CPU 326. The strategy stats calculation module 215 may perform a series of calculations about the quantitative trading strategy model's processes. In this example, not a limitation, a Sharpe ratio, an annualized volatility, a return over maximum drawdown, a return over commission costs, a traded percentage (%), a winning percentage (%), and years traded are being calculated. Then each calculated value obtained is compared to a predefined threshold, defined by, not a limitation, the system. If a trading strategy process score is higher than the system defined threshold, then the trading strategy process has passed the specific performance test. Also, for each performance score, the system may provide a series of recommendations as follows:

Sharpe ratio: measures an excess return per unit of risk. The Sharpe Ratio may compare the performance of different strategies or portfolios by considering both their returns and risks. A high Sharpe Ratio may be preferable since it indicates that the trading strategy model is generating a higher return with respect to its risk. The higher the risk, the better. If the calculated Sharpe Ratio value is <around 0.3 the system analysis, performance testing, and/or scoring modules 213 might recommend to not utilize the trading strategy as it does not seem to be profitable enough. Recommendation module 255 may then present or display suggestions on how to improve the trading strategy process.

Annualized volatility: is the annualized standard deviation of the returns. A high annualized volatility value may indicate significant movements in the profit and loss of the trading strategy model, while a low volatility may indicate more stable movements in the performance of the trading strategy model. The lower volatility, the better. If the calculated annualized volatility value is >roughly 10%, recommendation module 255 might recommend to review the risk management settings and reporting module 250 may display more detailed information about the analysis (see FIGS. 5 and 6).

Return over maximum drawdown: a measure of a reward of the trading strategy. Return over maximum drawdown may include, not a limitation, an average yearly return and calculated by dividing profit and loss over a capital. Maximum drawdown is a risk metric that may measure a largest peak-to-trough decline in the value of a trading strategy model. The drawdown represents the most significant loss a trading strategy model would have experienced. The higher drawdown score the better. If the calculated drawdown score value is <about 0.7, the system might recommend to review the risk management settings. For example, not a limitation, recommendation module 255 may recommend to review the risk management settings and reporting module 250 may display more detailed information about the analysis.

Return over commission costs: fees that traders pay to brokers for executing buy and sell orders in the financial markets. The costs may vary widely depending on many factors such as the broker, type of trade, and the volume of the trade. The commission costs may be charged as a fixed fee per share for equity and per contract for futures contracts. The impact of commission costs on trading strategies, particularly for high-frequency trading and trading strategies with a large number of transactions may be studied and taken into account. The commission costs may significantly affect the profitability of a trading strategy model. Thus, commission costs may be taken into consideration when developing, testing, and implementing trading strategy models. The higher return over commission costs, the better. If the calculated return over commission costs value is <about 0.7, the system might recommend to review the indicators parameters so that the strategy would trade less frequently. For example, not a limitation, recommendation module 255 may recommend to review the indicators parameters settings shown in reporting module 250 which may display more detailed information about the trading strategy analysis.

Traded percentage: a measure of a percentage of time that the trading strategy model is actually in the financial market. A trading strategy model with few trades may be considered not statistically significant, and the strategy model should be discarded. The higher trades, the better. If the calculated traded percentage value is <roughly 30%, the system might recommend to review the indicators parameters so that the strategy would trade more frequently. For example, not a limitation, recommendation module 255 may recommend to review the indicators parameters and reporting module 250 may display more detailed information about the analysis.

Winning percentage: measures the number of days in which the trading strategy was profitable over the total number of days in which the trading strategy has been simulated. The higher percentage, the better. If the calculated winning percentage value is <about 0.7, the system might be recommended to review the indicators parameters so that the trading strategy process may be more profitable. For example, not a limitation, recommendation module 255 may recommend to review the indicators parameters settings and reporting module 250 may display more detailed information about the analysis.

Years traded: the number of years that the trading strategy model is tested. The performance of the trading strategy model may not be significant if the number of years that the strategy model is tested on is low. The benefit of having a high number of traded years is two folds. First, a high number of traded years could make the test statistically significant since the model has more samples. Second, a larger period could cover different market conditions. A score may be defined based on the years traded to show the significance of the output of the trading strategy model. The higher the score, the better. If the determined number of traded years value is <roughly 10 years, the system might recommend to not use the trading strategy as it would not be statistically significant.

All Parameters Analysis module 220 may analyze the performance of a strategy model by running different combinations of input parameters. The backtests may be very computationally intensive, but All-Parameters Analysis module 220 may detect overfitting and calculating the optimal parameters for the trading strategy model. Backtesting may assess the viability of the trading strategy model by determining how the model would play out using historical data. Backtesting may involve applying historical data to the trading strategy or predictive model to determine the model's accuracy. Backtesting may allow traders to test various trading strategy models without the need to risk capital. Common backtesting measures may include, not a limitation, net profit/loss, return, risk-adjusted return, market exposure, volatility, etc. The main two routines of the All Parameters Analysis module are Sensitivity Analysis and Adaptability Analysis as follows.

In the sensitivity analysis routine, a trading strategy model may respond to changes in the model's input parameters. A strategy model with high parameter sensitivity may exhibit significant changes in performance for small changes in the model's input parameters, whereas a strategy model with a low parameter sensitivity may be relatively stable for small changes in the input parameters. Developing a trading strategy model with low parameter sensitivity may be important for many reasons. First, a trading strategy model with a low parameter sensitivity may be considered more robust, as it is less likely to be overly optimized to a specific market condition. Second, strategy models with high parameter sensitivity may suffer from overfitting, where the strategy model performs well on historical data but may fail to achieve similar performance in real-time trading. Finally, a low parameter sensitivity may contribute to the stability of the trading strategy model, making the strategy model less prone to fluctuations in performance due to small variations in input parameters. The stability may lead to a more consistent return and reduced drawdowns. The score for the variability of the input parameters may be calculated as the difference between the highest and lowest Sharpe Ratio considering all the variations in all the parameters. The number of all the variations is approximately equal to the product of the number of values for each input parameter. In order to run this routine, all possible combinations of the parameters given in the input might be backtested. The results of the backtest are compared, and the score is calculated as the difference between max and min Sharpe Ratio. The threshold may be roughly 0.5. If it is below the threshold, the parameters chosen are not different enough and the user is recommended to add more parameters.

In the adaptability analysis routine, an artificial intelligence (AI), machine or deep learning model may be utilized for a walk-forward optimization. The score may be calculated as the difference between the Sharpe Ratio between the model using the default parameters and the one computed using walk-forward optimization. If the score is >=0.5, then the strategy is not able to learn the parameters and the system might recommend to review the indicators. Note that roughly three learning periods may be considered in the testing process including, not a limitation, one year, four years, and all the history. For each of the learning time periods, a score may be calculated as the difference between the Sharpe Ratio of the strategy using default parameters and the strategy using learnt parameters. In order to learn the parameters, several techniques may be used, such us, not a limitation:
 1. Select the parameters with the best score
 2. Use a machine learning algorithm or ensemble that learns the parameters, including but not limited to artificial intelligence (AI), neural networks (deep or not), support vector machines, clustering, etc. In this routine, the score may be calculated by subtracting the Sharpe Ratio of the strategy calculated using the default parameters, with the parameters learnt. If the difference in Sharpe Ratio is >about 0.3 (or a predetermined threshold), then the strategy may not be able to learn, which may be an indication of an instable strategy. In the case, the user is recommended to try to change some of the indicators in order to increase the stability of the strategy.

Analysis of Individual Parameters Module 225 runs the same analysis performed in All Parameters Analysis Module 220, but instead of applying it to all the parameters at the same time, it just applies it to each parameter, keeping the others to the default value. In this way, it might help in optimizing the trading strategy model by focusing on the most influential parameters that may have a significant impact on the performance of the model. To study the variability for a given input parameter, the value of one parameter may be changed and the default values (e.g. selected by the user or system) may be used for the remaining parameters. The number of variations may be equal to the number of values for the considered parameter. The score calculations and the recommendations are the same as the All Parameters Analysis Module.

Transaction Costs Module 230 analyzes a sensitivity of the trading strategy model to changes in the commission's costs and slippage cost of the strategy model. Commissions Costs may have a significant impact on the performance of the trading strategy model. To show its effects, backtests using different commission cost profiles might be computed. These profiles are usually provided by the broker. Examples are: cost of trading 1 stock may be roughly $0.01, cost of trading 1 future contract may be approximately $1, loan for margin may be about 1%+Libor Rate. The backtesting evaluates the strategy using the commission's profiles and compares the Sharpe Ratio of the backtesting with the lower commissions with the one with the highest. If the difference is greater than around 0.2, then the trading strategy is very sensitive to commission costs, and the recommendation is to trade less.

The Slippage Costs analysis implementation involves simulating several scenarios, for example 1xbid-ask spread, 2xbid-ask spread, etc. Also in this case, the score may be calculated by subtracting the Sharpe Ratio of the simulation with the lowest slippage with the one with the highest slippage. If the difference is >0.2, then the slippage costs are high, trading to cost-efficient financial instruments may be recommended and presented to the user.

Trades Delay Analysis Module 235 may measure a degradation in the performance of a trading strategy model due to some delay in sending orders. In this analysis, different delays are being tested, for example about 1 day, 2 days, and/or 3 days. If the Sharpe ratio of the backtest without delays is >about 0.3 than the one with about 1 day delay, then the user is recommended to review their execution engine to make sure that the system may be able to send the trades quickly enough to not incur in significant losses.

Each system analysis and performance testing module is independent from each other and each can run and be executed in parallel from the others. Each analysis and performance testing module may create a set of scores that are incorporated and displayed in the system scoring, reporting, and/or recommendation modules.

The Overall Scoring method 245 is used for calculating a global score of an overall performance of the trading strategy model by normalizing single scores provided by the system analysis and performance testing process 213 and combining the single scores into groups. A global score of the overall performance of the trading strategy model might be calculated by normalizing single scores provided in the analysis and performance testing process and combining the single scores into groups. By default, each module may comprise, not a limitation, a group, but it is also possible to create customized groups by combining scores from different modules. The global score is defined as the combination of each individual score. There are several ways to calculate the overall score. Some examples are, but not limited to:
 Average of all the normalized scores
 Minimum of the average scores of each category
 Weighted scoring, in which each score may be assigned a weight, and the global score is the sum of the scores multiplied by its own weights. The system or framework is flexible enough to handle other types of scores and tests and may be expanded to include tests specific to each type of strategy model in addition to the performance tests.

System output data connector 240 simply distributes the scores, the analysis data, and the recommendation for the modules to output modules 243. Also in this case, it may be implemented in several ways, for example, not a limitation, via a multiplexer and a database which stores all the needed information.

Output module 243 such as GUI or display 340 may then show the output of the analysis and/or performance testing: the calculated scores, the global score, the reports, and the recommendations via a scoring module 245 that is configured to display the scores of the related strategy, a reporting module 250 that is configured to display more detailed information about the analysis, and a recommendation module 255 that is configured to display a suggestion to the user on how to improve the trading strategy model based on the system recommendations.

FIG. 3 is a block diagram depicting an exemplary client/server system which may be used by an exemplary computerized embodiment of the present invention.

A communication system 300 includes a multiplicity of clients with a sampling of clients denoted as a client 302 and a client 304, a multiplicity of local networks with a sampling of networks denoted as a local network 306 and a local network 308, a global network 310 and a multiplicity of servers with a sampling of servers denoted as a server 312 and a server 314.

Client 302 may communicate bi-directionally with local network 306 via a communication channel 316. Client 304 may communicate bi-directionally with local network 308 via a communication channel 318. Local network 306 may communicate bi-directionally with global network 310 via a communication channel 320. Local network 308 may communicate bi-directionally with global network or cloud networking 310 via a communication channel 322. Global or cloud network 310 may communicate bi-directionally with server 312 and server 314 via a communication channel 324. Server 312 and server 314 may communicate bi-directionally with each other via communication channel 324. Furthermore, clients 302, 304, local networks 306, 308, global network 310 and servers 312, 314 may each communicate bi-directionally with each other.

In one embodiment, global network 310 may operate as the Internet. It will be understood by those skilled in the art that communication system 300 may take many different forms. Non-limiting examples of forms for communication system 300 include local area networks (LANs), wide area networks (WANs), wired telephone networks, wireless networks, or any other network supporting data communication between respective entities.

Clients 302 and 304 may take many different forms. Non-limiting examples of clients 302 and 304 include personal or portable computers, personal digital assistants (PDAs), notebooks and smartphones.

Client 302 includes a CPU 326, a pointing device 328, a keyboard 330, a microphone 332, a printer 334, a memory 336, a mass memory storage 338, a GUI 340, a video camera 342, an input/output interface 344 and a network interface 346.

CPU 326, pointing device 328, keyboard 330, microphone 332, printer 334, memory 336, mass memory storage 338, GUI 340, video camera 342, input/output interface 344 and network interface 346 may communicate in a unidirectional manner or a bi-directional manner with each other via a communication channel 348. Communication channel 348 may be configured as a single communication channel or a multiplicity of communication channels.

CPU 326 may be comprised of a single processor or multiple processors. CPU 326 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general-purpose microprocessors.

As is well known in the art, memory 336 is used typically to transfer data and instructions to CPU 326 in a bi-directional manner. Memory 336, as discussed previously, may include any suitable computer-readable media, intended for data storage, such as those described above excluding any wired or wireless transmissions unless specifically noted. Mass memory storage 338 may also be coupled bi-directionally to CPU 326 and provides additional data storage capacity and may include any of the computer-readable media described above. Mass memory storage 338 may be used to store programs, data and the like and is typically a secondary storage medium such as a hard disk. It will be appreciated that the information retained within mass memory storage 338, may, in appropriate cases, be incorporated in standard fashion as part of memory 336 as virtual memory.

CPU 326 may be coupled to GUI 340. GUI 340 enables a user to view the operation of computer operating system and software. CPU 326 may be coupled to pointing device 328. Non-limiting examples of pointing device 328 include computer mouse, trackball and touchpad. Pointing device 328 enables a user with the capability to maneuver a computer cursor about the viewing area of GUI 340 and select areas or features in the viewing area of GUI 340. CPU 326 may be coupled to keyboard 330. Keyboard 330 enables a user with the capability to input alphanumeric textual information to CPU 326. CPU 326 may be coupled to microphone 332. Microphone 332 enables audio produced by a user to be recorded, processed and communicated by CPU 326. CPU 326 may be connected to printer 334. Printer 334 enables a user with the capability to print information to a sheet of paper. CPU 326 may be connected to video camera 342. Video camera 342 enables video produced or captured by user to be recorded, processed and communicated by CPU 326.

CPU 326 may also be coupled to input/output interface 344 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 326 optionally may be coupled to network interface 346 which enables communication with an external device such as a database or a computer or telecommunications or internet network using an external connection shown generally as communication channel 316, which may be implemented as a hardwired or wireless communications link using suitable conventional technologies. With such a connection, CPU 326 might receive information from the network, or might output information to a network in the course of performing the method steps described in the teachings of the present invention.

Figure 4:
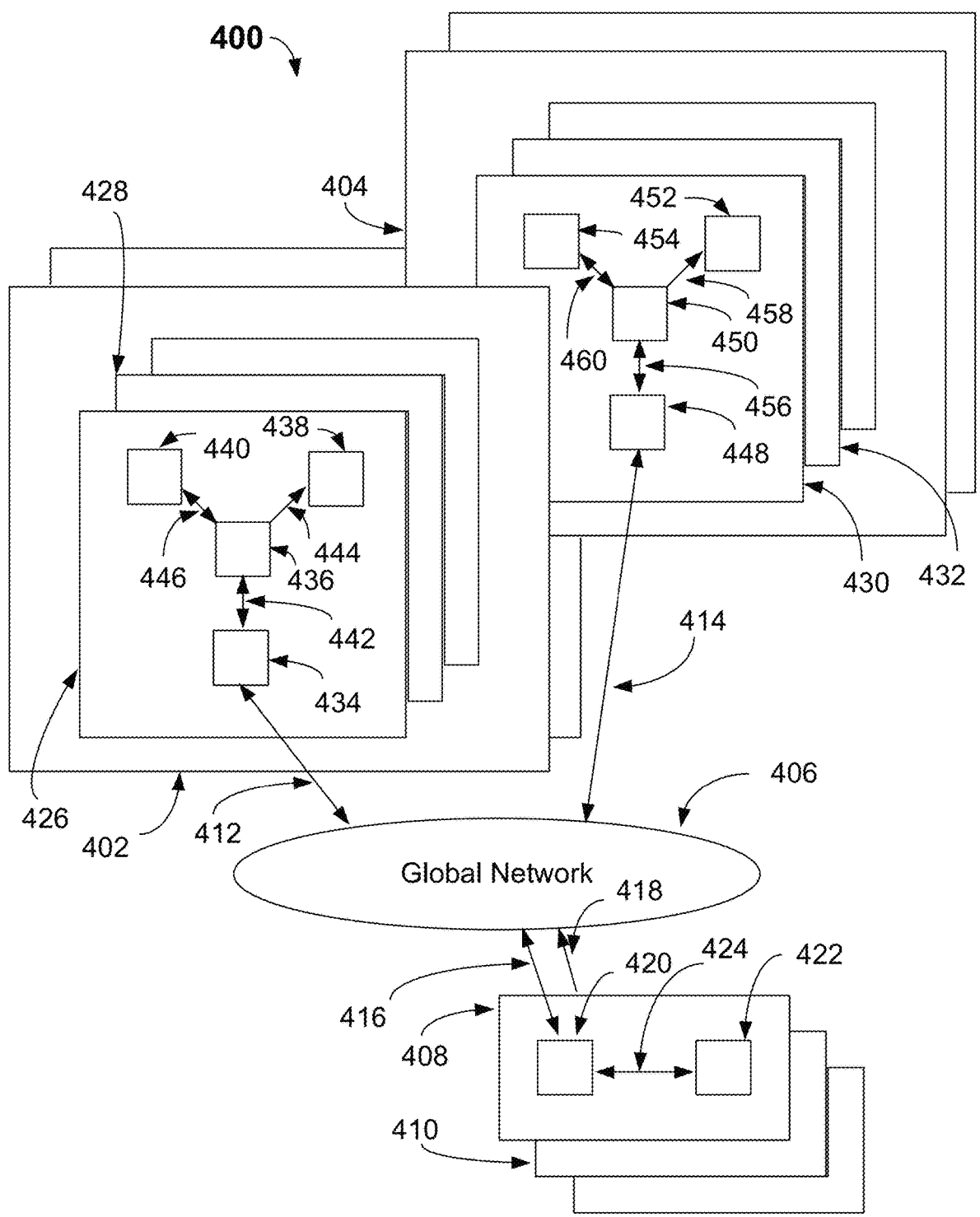
FIG. 4 illustrates a block diagram depicting a conventional client/server communication system, which may be used by an exemplary web-enabled/networked embodiment of the present invention.

FIG. 4 illustrates a block diagram depicting a conventional client/server communication system, which may be used by an exemplary web-enabled/networked Scoring and Recommendation system and method embodiment of the present invention.

A communication system 400 includes a multiplicity of networked regions with a sampling of regions denoted as a network region 402 and a network region 404, a global network 406 and a multiplicity of servers with a sampling of servers denoted as a server device 408 and a server device 410.

Network region 402 and network region 404 may operate to represent a network contained within a geographical area or region. Non-limiting examples of representations for the geographical areas for the networked regions may include postal zip codes, telephone area codes, states, counties, cities and countries. Elements within network region 402 and 404 may operate to communicate with external elements within other networked regions or within elements contained within the same network region.

In some implementations, global network 406 may operate as the Internet. It will be understood by those skilled in the art that communication system 400 may take many different forms. Non-limiting examples of forms for communication system 400 include local area networks (LANs), wide area networks (WANs), wired telephone networks, cellular telephone networks or any other network supporting data communication between respective entities via hardwired or wireless communication networks. Global network 406 may operate to transfer information between the various networked elements.

Server device 408 and server device 410 may operate to execute software instructions, store information, support database operations and communicate with other networked elements. Non-limiting examples of software and scripting languages which may be executed on server device 408 and server device 410 include C, C++, C# and Java.

Network region 402 may operate to communicate bi-directionally with global network 406 via a communication channel 412. Network region 404 may operate to communicate bi-directionally with global network 406 via a communication channel 414. Server device 408 may operate to communicate bi-directionally with global network 406 via a communication channel 416. Server device 410 may operate to communicate bi-directionally with global network 406 via a communication channel 418. Network region 402 and 404, global network 406 and server devices 408 and 410 may operate to communicate with each other and with every other networked device located within communication system 400.

Server device 408 includes a networking device 420 and a server 422. Networking device 420 may operate to communicate bi-directionally with global network 406 via communication channel 416 and with server 422 via a communication channel 424. Server 422 may operate to execute software instructions and store information.

Network region 402 includes a multiplicity of clients with a sampling denoted as a client 426 and a client 428. Client 426 includes a networking device 434, a processor 436, a GUI 438 and an interface device 440. Non-limiting examples of devices for GUI 438 include monitors, televisions, cellular telephones, smartphones and PDAs (Personal Digital Assistants). Non-limiting examples of interface device 440 include pointing device, mouse, trackball, scanner and printer. Networking device 434 may communicate bi-directionally with global network 406 via communication channel 412 and with processor 436 via a communication channel 442. GUI 438 may receive information from processor 436 via a communication channel 444 for presentation to a user for viewing. Interface device 440 may operate to send control information to processor 436 and to receive information from processor 436 via a communication channel 446. Network region 404 includes a multiplicity of clients with a sampling denoted as a client 430 and a client 432. Client 430 includes a networking device 448, a processor 450, a GUI 452 and an interface device 454. Non-limiting examples of devices for GUI 438 include monitors, televisions, cellular telephones, smartphones and PDAs (Personal Digital Assistants). Non-limiting examples of interface device 440 include pointing devices, mousse, trackballs, scanners and printers. Networking device 448 may communicate bi-directionally with global network 406 via communication channel 414 and with processor 450 via a communication channel 456. GUI 452 may receive information from processor 450 via a communication channel 458 for presentation to a user for viewing. Interface device 454 may operate to send control information to processor 450 and to receive information from processor 450 via a communication channel 460.

For example, consider the case where a user interfacing with client 426 may want to execute a networked application. A user may enter the IP (Internet Protocol) address for the networked application using interface device 440. The IP address information may be communicated to processor 436 via communication channel 446. Processor 436 may then communicate the IP address information to networking device 434 via communication channel 442. Networking device 434 may then communicate the IP address information to global network 406 via communication channel 412. Global network 406 may then communicate the IP address information to networking device 420 of server device 408 via communication channel 416. Networking device 420 may then communicate the IP address information to server 422 via communication channel 424. Server 422 may receive the IP address information and after processing the IP address information may communicate return information to networking device 420 via communication channel 424. Networking device 420 may communicate the return information to global network 406 via communication channel 416. Global network 406 may communicate the return information to networking device 434 via communication channel 412. Networking device 434 may communicate the return information to processor 436 via communication channel 442. Processor 436 may communicate the return information to GUI 438 via communication channel 444. User may then view the return information on GUI 438.

A communication system 400 includes a multiplicity of networked regions with a sampling of regions denoted as a network region 402 and a network region 404, a global network 406 and a multiplicity of servers with a sampling of servers denoted as a server device 408 and a server device 410.

Network region 402 and network region 404 may operate to represent a network contained within a geographical area or region. Non-limiting examples of representations for the geographical areas for the networked regions may include postal zip codes, telephone area codes, states, counties, cities and countries. Elements within network region 402 and 404 may operate to communicate with external elements within other networked regions or within elements contained within the same network region.

In some implementations, global network 406 may operate as the Internet. It will be understood by those skilled in the art that communication system 400 may take many different forms. Non-limiting examples of forms for communication system 400 include local area networks (LANs), wide area networks (WANs), wired telephone networks, cellular telephone networks or any other network supporting data communication between respective entities via hardwired or wireless communication networks. Global network 406 may operate to transfer information between the various networked elements.

Server device 408 and server device 410 may operate to execute software instructions, store information, support database operations and communicate with other networked elements. Non-limiting examples of software and scripting languages which may be executed on server device 408 and server device 410 include C, C++, C# and Java.

Network region 402 may operate to communicate bi-directionally with global network 406 via a communication channel 412. Network region 404 may operate to communicate bi-directionally with global network 406 via a communication channel 414. Server device 408 may operate to communicate bi-directionally with global network 406 via a communication channel 416. Server device 410 may operate to communicate bi-directionally with global network 406 via a communication channel 418. Network region 402 and 404, global network 406 and server devices 408 and 410 may operate to communicate with each other and with every other networked device located within communication system 400.

Server device 408 includes a networking device 420 and a server 422. Networking device 420 may operate to communicate bi-directionally with global network 406 via communication channel 416 and with server 422 via a communication channel 424. Server 422 may operate to execute software instructions and store information.

Network region 402 includes a multiplicity of clients with a sampling denoted as a client 426 and a client 428. Client 426 includes a networking device 434, a processor 436, a GUI 438 and an interface device 440. Non-limiting examples of devices for GUI 438 include monitors, televisions, cellular telephones, smartphones and PDAs (Personal Digital Assistants). Non-limiting examples of interface device 440 include pointing device, mouse, trackball, scanner and printer. Networking device 434 may communicate bi-directionally with global network 406 via communication channel 412 and with processor 436 via a communication channel 442. GUI 438 may receive information from processor 436 via a communication channel 444 for presentation to a user for viewing. Interface device 440 may operate to send control information to processor 436 and to receive information from processor 436 via a communication channel 446. Network region 404 includes a multiplicity of clients with a sampling denoted as a client 430 and a client 432. Client 430 includes a networking device 448, a processor 450, a GUI 452 and an interface device 454. Non-limiting examples of devices for GUI 438 include monitors, televisions, cellular telephones, smartphones and PDAs (Personal Digital Assistants). Non-limiting examples of interface device 440 include pointing devices, mousse, trackballs, scanners and printers. Networking device 448 may communicate bi-directionally with global network 406 via communication channel 414 and with processor 450 via a communication channel 456. GUI 452 may receive information from processor 450 via a communication channel 458 for presentation to a user for viewing. Interface device 454 may operate to send control information to processor 450 and to receive information from processor 450 via a communication channel 460.

For example, consider the case where a user interfacing with client 426 may want to execute a networked application. A user may enter the IP (Internet Protocol) address for the networked application using interface device 440. The IP address information may be communicated to processor 436 via communication channel 446. Processor 436 may then communicate the IP address information to networking device 434 via communication channel 442. Networking device 434 may then communicate the IP address information to global network 406 via communication channel 412. Global network 406 may then communicate the IP address information to networking device 420 of server device 408 via communication channel 416. Networking device 420 may then communicate the IP address information to server 422 via communication channel 424. Server 422 may receive the IP address information and after processing the IP address information may communicate return information to networking device 420 via communication channel 424. Networking device 420 may communicate the return information to global network 406 via communication channel 416. Global network 406 may communicate the return information to networking device 434 via communication channel 412. Networking device 434 may communicate the return information to processor 436 via communication channel 442. Processor 436 may communicate the return information to GUI 438 via communication channel 444. User may then view the return information on GUI 438.

Figure 5:
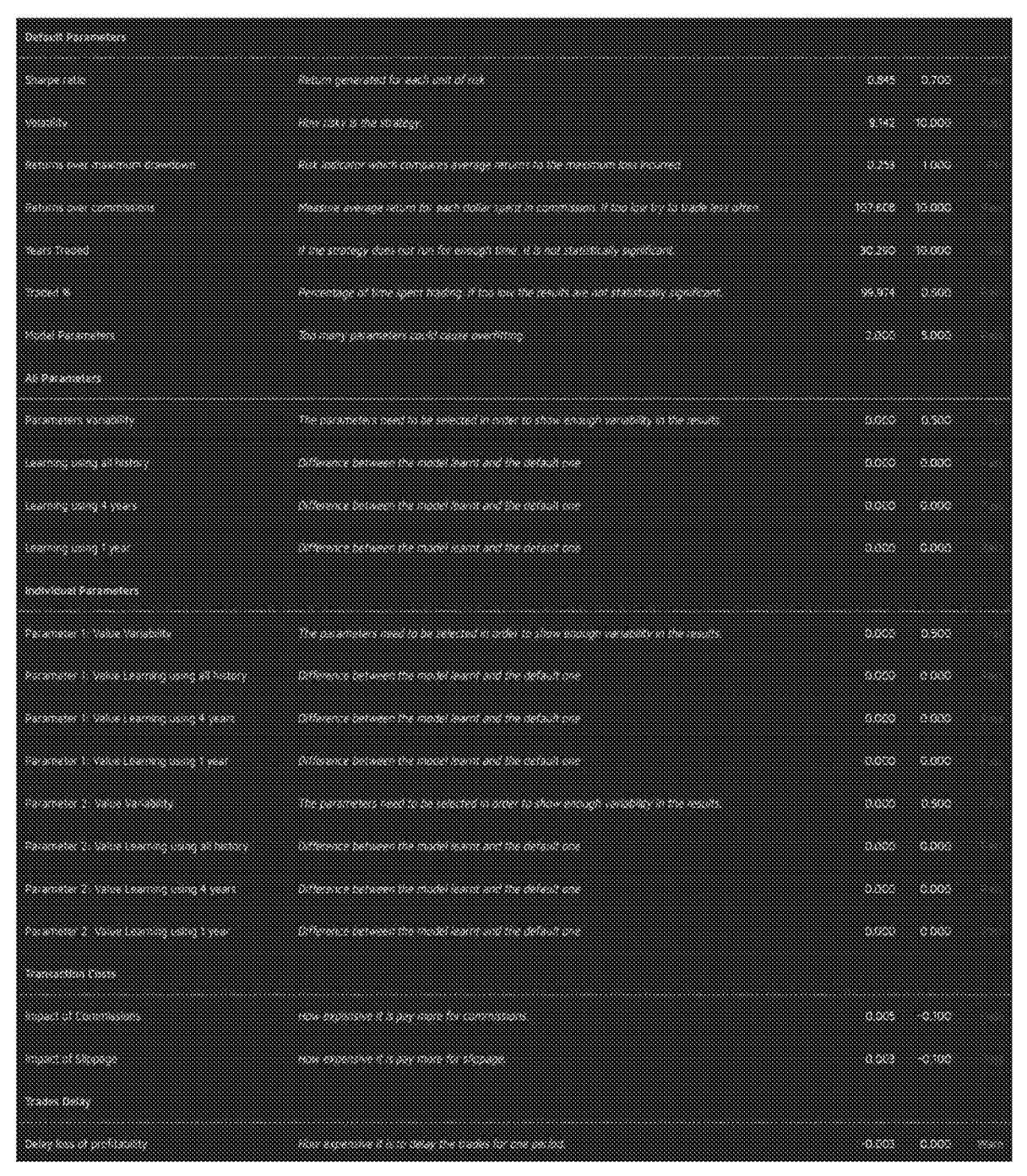

FIG. 5 is an illustration of an exemplary Score Board, in accordance with an embodiment of the present invention. In one embodiment of the present invention, the system scoring module 245 may generate and display the score board as shown.

Figure 6:
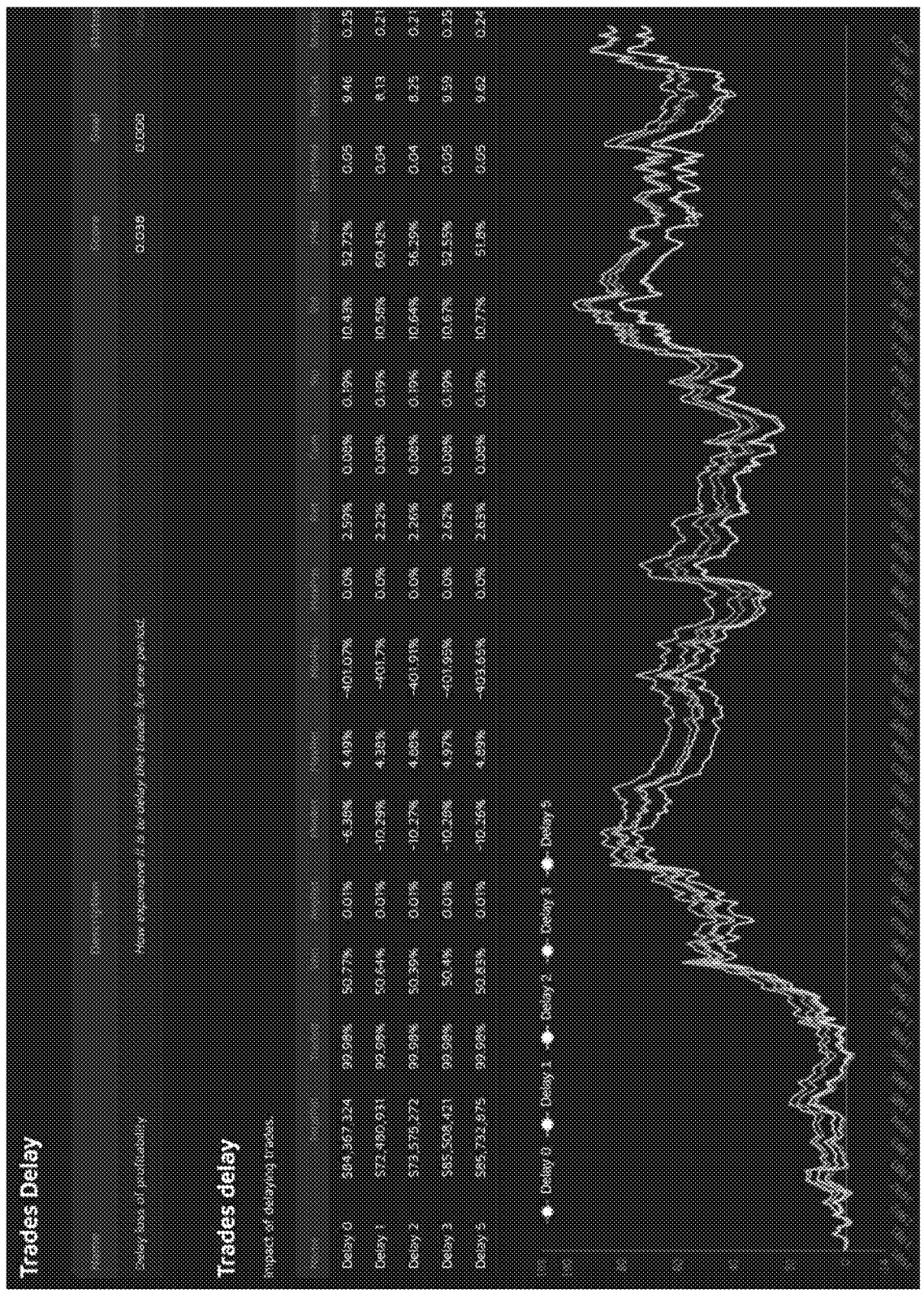
FIG. 6 is an illustration of an exemplary Report, in accordance with an embodiment of the present invention.

FIG. 6 is an illustration of an exemplary Report, in accordance with an embodiment of the present invention. The figure shows an example of one of the reports generated by the system reporting module 250. The reports may provide additional information about how the score has been calculated and how to improve/review the score. There are several ways to show this information, this is only one variant.

Figure 7A:
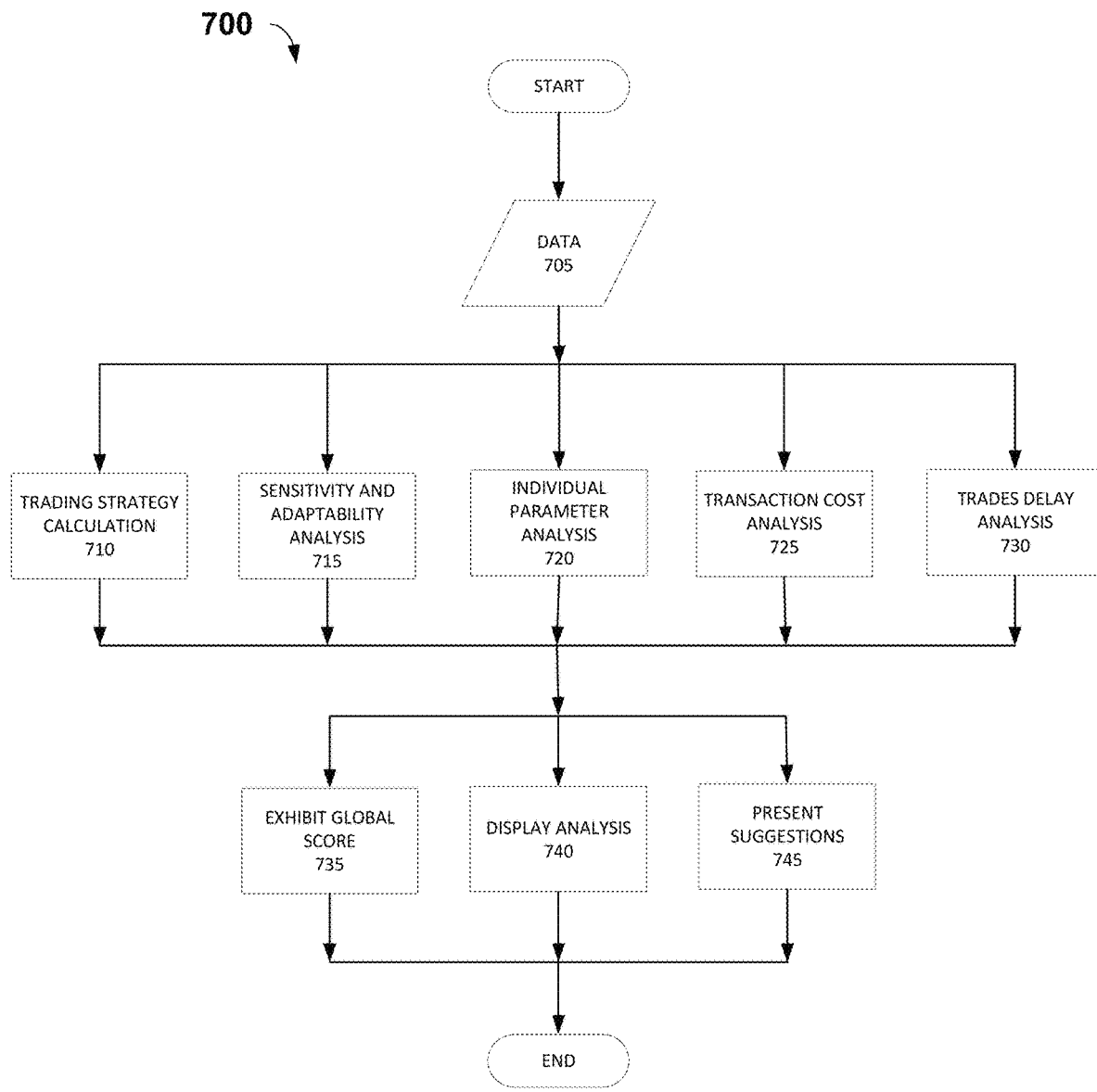
FIG. 7A is an illustration of an exemplary flowchart of a Scoring and Recommendation system, method and program product, in accordance with an embodiment of the present invention.

FIG. 7A is an illustration of an exemplary flowchart of a Scoring and Recommendation system, method and program product, in accordance with an embodiment of the present invention. In a Step 705, when the parameters of the trading strategy model are inserted, the input module has insert default data values stored in memory (e.g. the ones a user thinks are the best) and other reasonable data values that make sense for the trading strategy. Other data values may be used for testing a sensitivity and the learning of the trading strategy model parameters. A "default strategy" model is a model that may use default parameters.

Referring to FIG. 2 and FIG. 7, input data may be distributed among various system analysis, performance testing, and/or scoring modules 213. The distribution of the input data may be implemented in several ways, for example, not a limitation, via the database/memory which may store all the input data information and distributed to the various system analysis, performance testing, and/or scoring modules. In a Step 710, a series of calculations about the quantitative trading strategy model's processes may be performed including, not a limitation, a Sharpe ratio, an annualized volatility, a return over maximum drawdown, a return over commission costs, a traded percentage (%), a winning percentage (%), and years traded are being calculated. Then each calculated value obtained is compared to a predefined threshold, defined by, not a limitation, the system. If a trading strategy process score is higher than the system predefined threshold, then the trading strategy process has passed the specific performance test. For each performance score, the system may provide a series of recommendations including, not a limitation:

Sharpe ratio: measures an excess return per unit of risk. The Sharpe Ratio may compare the performance of different strategies or portfolios by considering both their returns and risks. A high Sharpe Ratio may be preferable since it indicates that the trading strategy model is generating a higher return with respect to its risk. The higher the risk, the better. If the calculated Sharpe Ratio value is <around 0.3 the system analysis, performance testing, and/or scoring modules 213 might recommend to not utilize the trading strategy as it does not seem to be profitable enough. In a Step 745, Recommendation module 255 may then present or display suggestions on how to improve the trading strategy process.

Annualized volatility: is the annualized standard deviation of the returns. A high annualized volatility value may indicate significant movements in the profit and loss of the trading strategy model, while a low volatility may indicate more stable movements in the performance of the trading strategy model. The lower volatility, the better. If the calculated annualized volatility value is >roughly 10%, recommendation module 255 may recommend to review the risk management settings and reporting module 250 may display more detailed information about the analysis in a Step 740.

Return over maximum drawdown: a measure of a reward of the trading strategy. Return over maximum drawdown may include, not a limitation, an average yearly return and calculated by dividing profit and loss over a capital. Maximum drawdown is a risk metric that may measure a largest peak-to-trough decline in the value of a trading strategy model. The drawdown represents the most significant loss a trading strategy model would have experienced. The higher drawdown score the better. In a Step 745, if the calculated drawdown score value is <about 0.7, the system might recommend to review the risk management settings. For example, not a limitation, recommendation module 255 may recommend to review the risk management settings in Step 745 and reporting module 250 may display more detailed information about the analysis in Step 740.

Return over commission costs: fees that traders pay to brokers for executing buy and sell orders in the financial markets. The costs may vary widely depending on many factors such as the broker, type of trade, and the volume of the trade. The commission costs may be charged as a fixed fee per share for equity and per contract for futures contracts. The impact of commission costs on trading strategies, particularly for high-frequency trading and trading strategies with a large number of transactions may be studied and taken into account. The commission costs may significantly affect the profitability of a trading strategy model. Thus, commission costs may be taken into consideration when developing, testing, and implementing trading strategy models. The higher return over commission costs, the better. In Step 745, if the calculated return over commission costs value is <about 0.7, the system might recommend to review the indicators parameters so that the strategy would trade less frequently. For example, not a limitation, recommendation module 255 may recommend to review the indicators parameters settings in Step 745 which may display more detailed information about the trading strategy analysis in Step 740.

Traded percentage: a measure of a percentage of time that the trading strategy model is actually in the financial market. A trading strategy model with few trades may be considered not statistically significant, and the strategy model should be discarded. The higher trades, the better. In Step 745, if the calculated traded percentage value is <roughly 30%, the system might recommend to review the indicators parameters so that the strategy would trade more frequently. For example, not a limitation, recommendation module 255 may recommend to review the indicators parameters in Step 745 and reporting module 250 may display more detailed information about the analysis in Step 740.

Winning percentage: measures the number of days in which the trading strategy was profitable over the total number of days in which the trading strategy has been simulated. The higher percentage, the better. In Step 745, if the calculated winning percentage value is <about 0.7, the system might be recommended to review the indicators parameters so that the trading strategy process may be more profitable. For example, not a limitation, recommendation module 255 may recommend to review the indicators parameters settings in Step 745 and reporting module 250 may display more detailed information about the analysis in Step 740.

Years traded: the number of years that the trading strategy model is tested. The performance of the trading strategy model may not be significant if the number of years that the strategy model is tested on is low. The benefit of having a high number of traded years is two folds. First, a high number of traded years could make the test statistically significant since the model has more samples. Second, a larger period could cover different market conditions. In a Step 735, a score may be defined based on the years traded to show the significance of the output of the trading strategy model in Step 745. The higher the score, the better. In Step 745, if the determined number of traded years value is <roughly 10 years, the system might recommend to not use the trading strategy as it would not be statistically significant.

In a Step 715, All Parameters Analysis module 220 may analyze the performance of a strategy model by running different combinations of input parameters. The backtests may be very computationally intensive, but All-Parameters Analysis module 220 may detect overfitting and calculating the optimal parameters for the trading strategy model in Step 715. Backtesting may assess the viability of the trading strategy model by determining how the model would play out using historical data. Backtesting may involve applying historical data to the trading strategy or predictive model to determine the model's accuracy. Backtesting may allow traders to test various trading strategy models without the need to risk capital. Common backtesting measures may include, not a limitation, net profit/loss, return, risk-adjusted return, market exposure, volatility, etc. The main two routines of the All Parameters Analysis module are Sensitivity Analysis and Adaptability Analysis as follows.

In the sensitivity analysis routine, a trading strategy model may respond to changes in the model's input parameters. A strategy model with high parameter sensitivity may exhibit significant changes in performance for small changes in the model's input parameters, whereas a strategy model with a low parameter sensitivity may be relatively stable for small changes in the input parameters. Developing a trading strategy model with low parameter sensitivity may be important for many reasons. First, a trading strategy model with a low parameter sensitivity may be considered more robust, as it is less likely to be overly optimized to a specific market condition. Second, strategy models with high parameter sensitivity may suffer from overfitting, where the strategy model performs well on historical data but may fail to achieve similar performance in real-time trading. Finally, a low parameter sensitivity may contribute to the stability of the trading strategy model, making the strategy model less prone to fluctuations in performance due to small variations in input parameters. The stability may lead to a more consistent return and reduced drawdowns. The score for the variability of the input parameters may be calculated as the difference between the highest and lowest Sharpe Ratio considering all the variations in all the parameters. The number of all the variations is approximately equal to the product of the number of values for each input parameter. In order to run this routine, all possible combinations of the parameters given in the input might be backtested. The results of the backtest are compared, and the score is calculated as the difference between max and min Sharpe Ratio. The threshold may be roughly 0.5. If it is below the threshold, the parameters chosen are not different enough and the user is recommended to add more parameters.

In the adaptability analysis routine, an artificial intelligence (AI), machine or deep learning model may be utilized for a walk-forward optimization. The score may be calculated as the difference between the Sharpe Ratio between the model using the default parameters and the one computed using walk-forward optimization. If the score is >=0.5, then the strategy is not able to learn the parameters and the system might recommend to review the indicators. Note that roughly three learning periods may be considered in the testing process including, not a limitation, one year, four years, and all the history. For each of the learning time periods, a score may be calculated as the difference between the Sharpe Ratio of the strategy using default parameters and the strategy using learnt parameters. In order to learn the parameters, several techniques may be used, such us, not a limitation:

1. Select the parameters with the best score
2. Use a machine learning algorithm or ensemble that learns the parameters, including but not limited to artificial intelligence (AI), neural networks (deep or not), support vector machines, clustering, etc. In this routine, the score may be calculated by subtracting the Sharpe Ratio of the strategy calculated using the default parameters, with the parameters learnt. If the difference in Sharpe Ratio is >about 0.3 (or a predetermined threshold), then the strategy may not be able to learn, which may be an indication of an instable strategy. In the case, the user is recommended to try to change some of the indicators in order to increase the stability of the strategy.

In a Step 720, a series of calculations about the quantitative trading strategy model's processes may be performed. But instead of applying the calculations to all the parameters at the same time, Analysis of Individual Parameters Module 225 (as compared to All Parameters Analysis Module 220) applies the calculations to each parameter, keeping other parameters to the default value. In this way, it might help in optimizing the trading strategy model by focusing on the most influential parameters that may have a significant impact on the performance of the model. To study the variability for a given input parameter, the value of one parameter may be changed and the default values (e.g. selected by the user or system) may be used for the remaining parameters. The number of variations may be equal to the number of values for the considered parameter. The score calculations and the recommendations are the same as the All Parameters Analysis Module.

In a Step 725, a sensitivity of the trading strategy model is analyzed to changes in, not a limitation, the commission's costs and slippage cost of the strategy model. Commissions Costs may have a significant impact on the performance of the trading strategy model. To show its effects, backtests using different commission cost profiles may be computed. These profiles are usually provided by the broker. Examples are: cost of trading 1 stock may be roughly $0.01, cost of trading 1 future contract may be approximately $1, loan for margin may be about 1%+Libor Rate. The backtesting evaluates the strategy using the commission's profiles and compares the Sharpe Ratio of the backtesting with the lower commissions with the one with the highest. If the difference is greater than around 0.2, then the trading strategy is very sensitive to commission costs, and the recommendation is to trade less.

Step 725 may further involve simulating several scenarios, for example 1xbid-ask spread, 2xbid-ask spread, etc. In this case, the score may be calculated by subtracting the Sharpe Ratio of the simulation with the lowest slippage with the one with the highest slippage. Then, in Step 745, if the difference is >0.2, then the slippage costs are high, trading to cost-efficient financial instruments may be recommended and presented to the user.

In a Step 730, a degradation in the performance of a trading strategy model due to some delay in sending orders may be measured. In this analysis, different delays may be tested, for example, not a limitation, about 1 day, 2 days, and/or 3 days. Then in Step 745, if the Sharpe ratio of the backtest without delays is >about 0.3 than the one with about 1 day delay, then the user may be presented a recommendation to review their execution engine to make sure that the system may be able to send the trades quickly enough to not incur significant losses.

Each system analysis and performance testing module may be independent from each other, and each can run and may be executed in parallel from the others. Each analysis and performance testing module may create a set of scores that are incorporated and displayed in the system scoring, reporting, and/or recommendation modules in Steps 735-745.

In Step 735, a global score of an overall performance of the trading strategy model may be calculated by normalizing single scores provided by the system analysis and performance testing process 213 and combining the single scores into groups. The global score of the overall performance of the trading strategy model might be calculated by normalizing single scores provided in the analysis and performance testing process and combining the single scores into groups. By default, each module may comprise, not a limitation, a group, but it is also possible to create customized groups by combining scores from different modules. The global score is defined as the combination of each individual score. There are several ways to calculate the overall score. Some examples are, but not limited to:

Average of all the normalized scores

Minimum of the average scores of each category

Weighted scoring, in which each score may be assigned a weight, and the global score is the sum of the scores multiplied by its own weights. The system or framework is flexible enough to handle other types of scores and tests and may be expanded to include tests specific to each type of strategy model in addition to the performance tests.

The scores, the analysis data, and the recommendation for the modules are distributed to output modules 243. Output module 243 such as GUI or display 340 may then show the output of the analysis and/or performance testing in Step 740. In Step 735, the calculated scores, the global score, the reports, and the recommendations via a scoring module 245 that is configured to display the scores of the related strategy. In Step 740, reporting module 250 is configured to display more detailed information about the analysis. And, in Step 745, recommendation module 255 is configured to display a suggestion to the user on how to improve the trading strategy model based on the system recommendations.

Figure 7B:
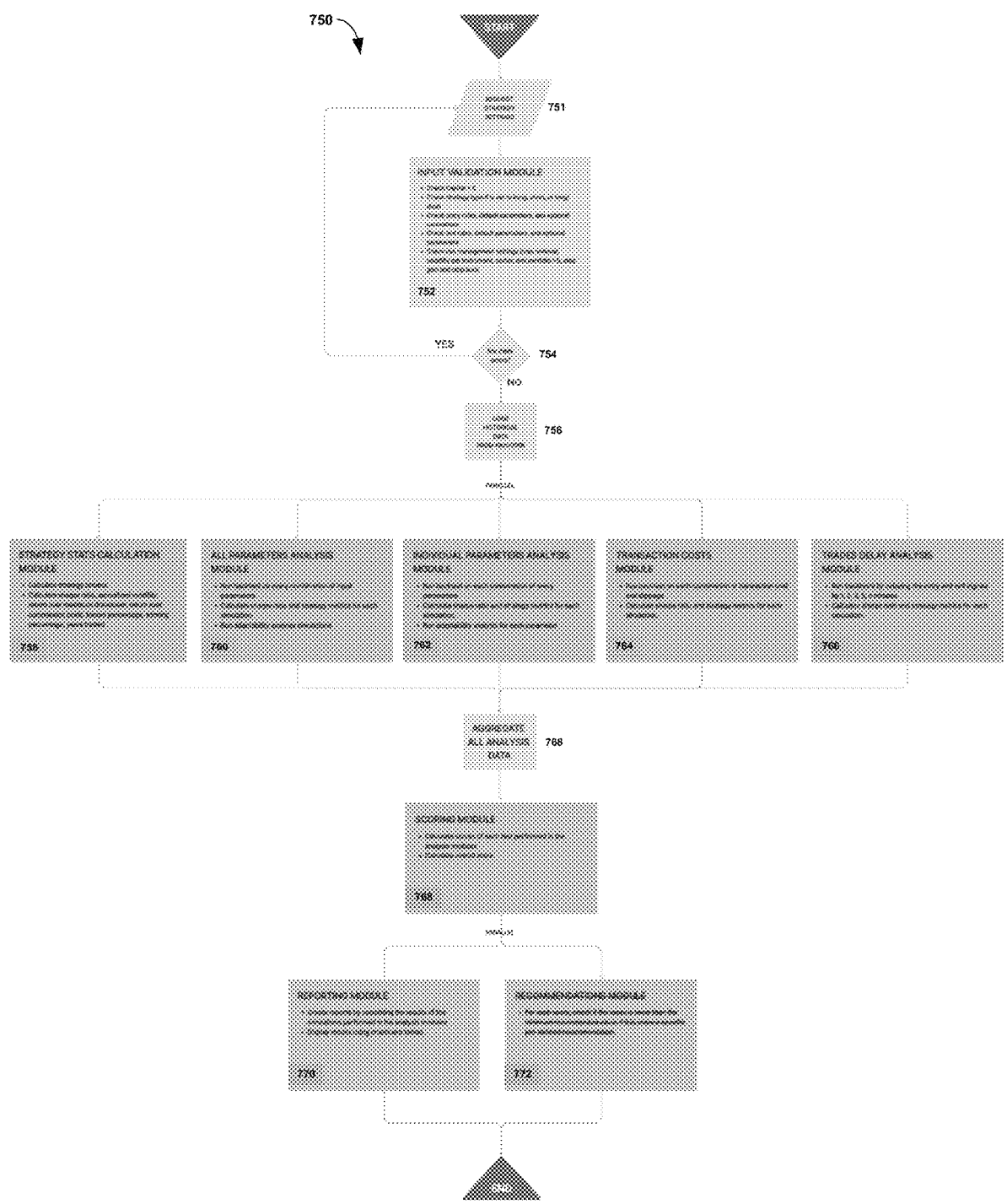
FIG. 7B is an illustration of an exemplary flowchart of a Scoring and Recommendation system, method and program product, in accordance with an embodiment of the present invention.

FIG. 7B is an illustration of an exemplary flowchart of a Scoring and Recommendation system, method and program product, in accordance with an embodiment of the present invention. FIG. 7B is an alternative embodiment of FIG. 7A. FIGS. 8-17 are exemplary illustrations of the different steps shown in FIG. 7B.

Figure 8:
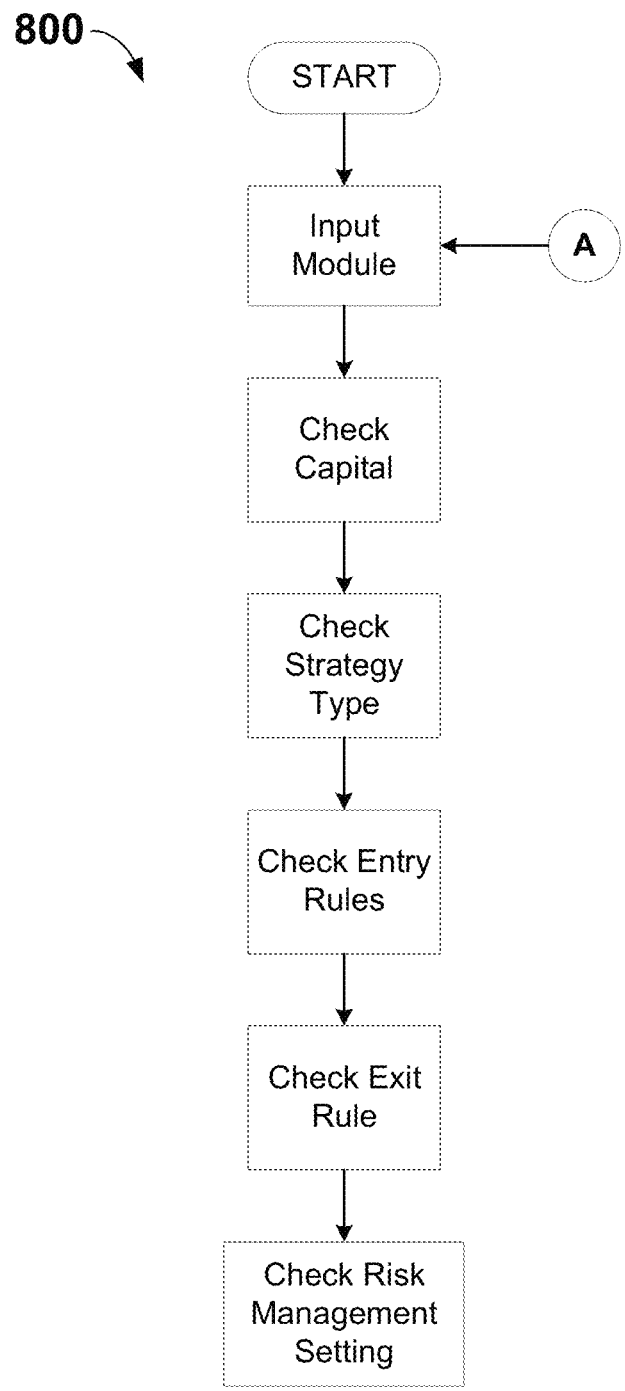
FIG. 8 is an illustration of an exemplary flowchart of an input validation module operation, in accordance with an embodiment of the present invention.

FIG. 8 is an illustration of an exemplary flowchart of an input validation module (752) operation 800, in accordance with an embodiment of the present invention.

Figure 9:
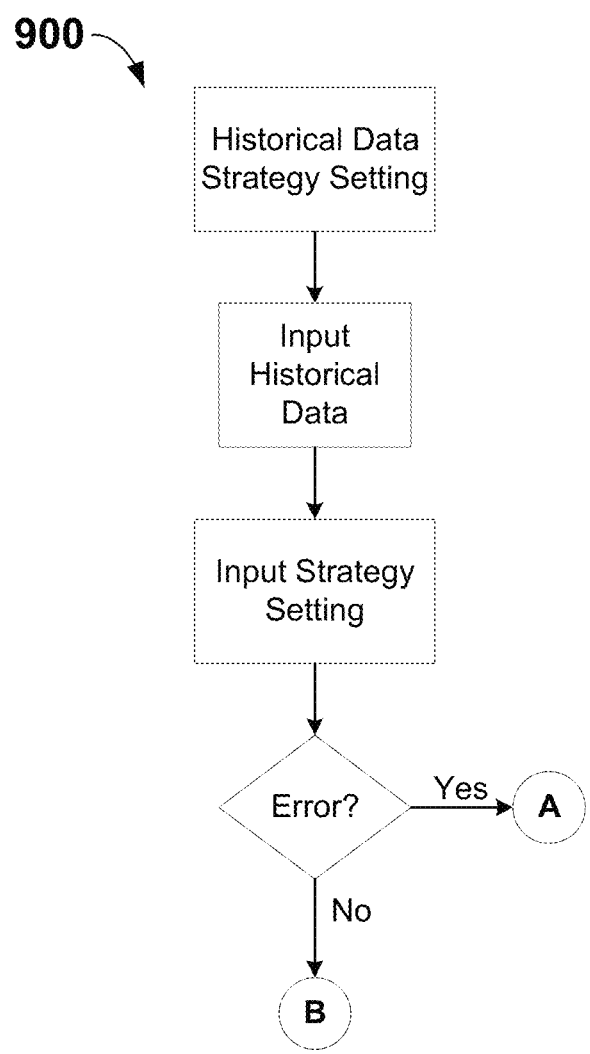
FIG. 9 is an illustration of an exemplary flowchart of a historical data strategy setting, in accordance with an embodiment of the present invention.

FIG. 9 is an illustration of an exemplary flowchart of a historical data strategy setting 900, in accordance with an embodiment of the present invention.

Figure 10:
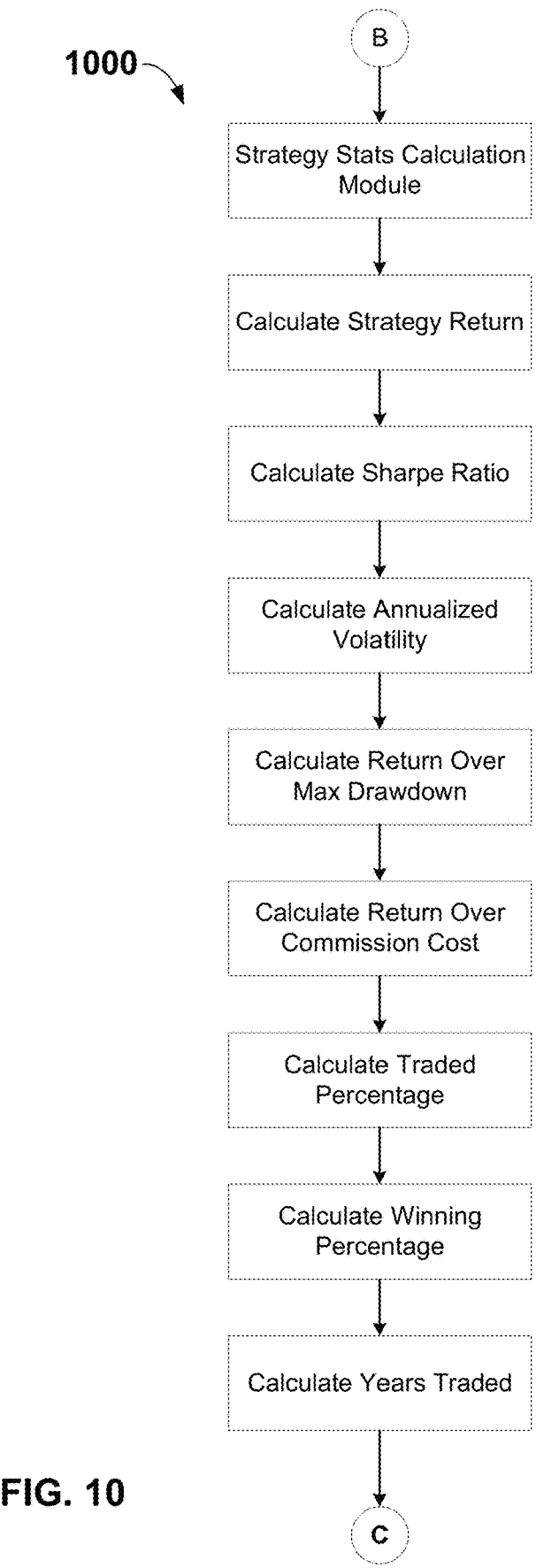
FIG. 10 is an illustration of an exemplary flowchart of a strategy stats calculation module activity, in accordance with an embodiment of the present invention.

FIG. 10 is an illustration of an exemplary flowchart of a strategy stats calculation module (758) activity 1000, in accordance with an embodiment of the present invention.

Figure 11:
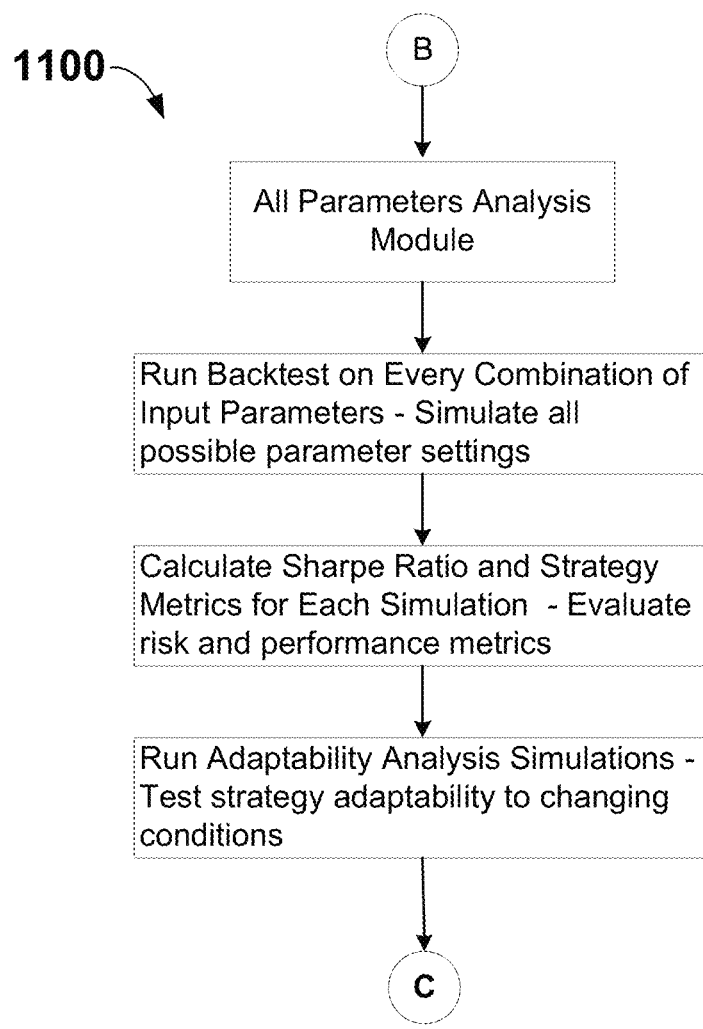
FIG. 11 is an illustration of an exemplary flowchart of an All-Parameters Analysis Module step, in accordance with an embodiment of the present invention.

FIG. 11 is an illustration of an exemplary flowchart of an All-Parameters Analysis Module (760) step 1100, in accordance with an embodiment of the present invention.

Figure 12:
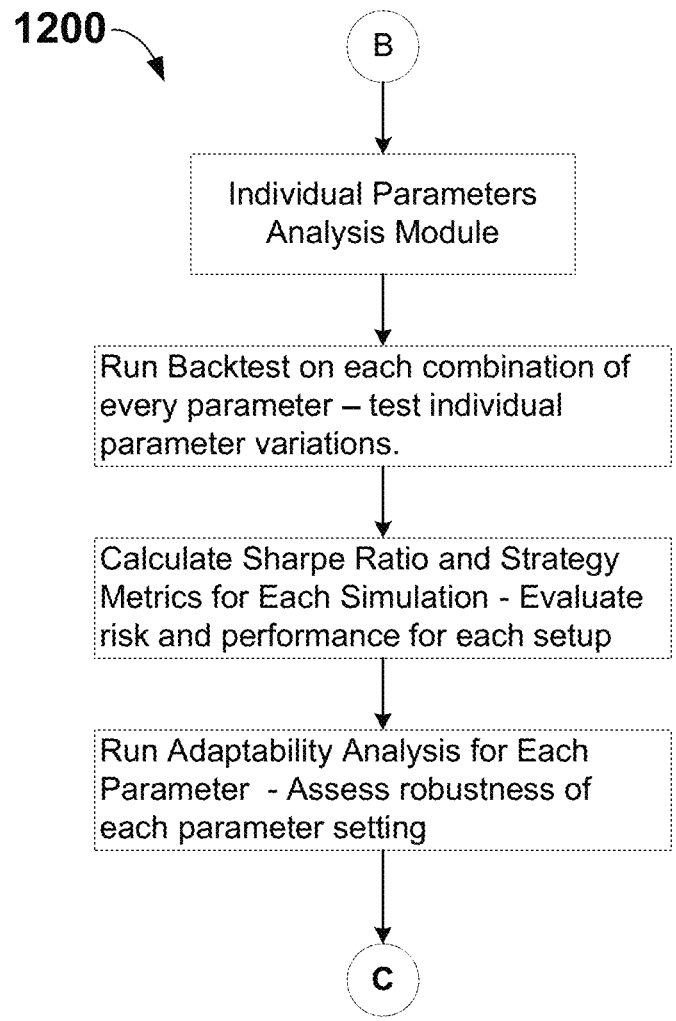
FIG. 12 is an illustration of an exemplary flowchart of an Individual Parameters Analysis Module operation, in accordance with an embodiment of the present invention.

FIG. 12 is an illustration of an exemplary flowchart of an Individual Parameters Analysis Module (762) operation 1200, in accordance with an embodiment of the present invention.

Figure 13:
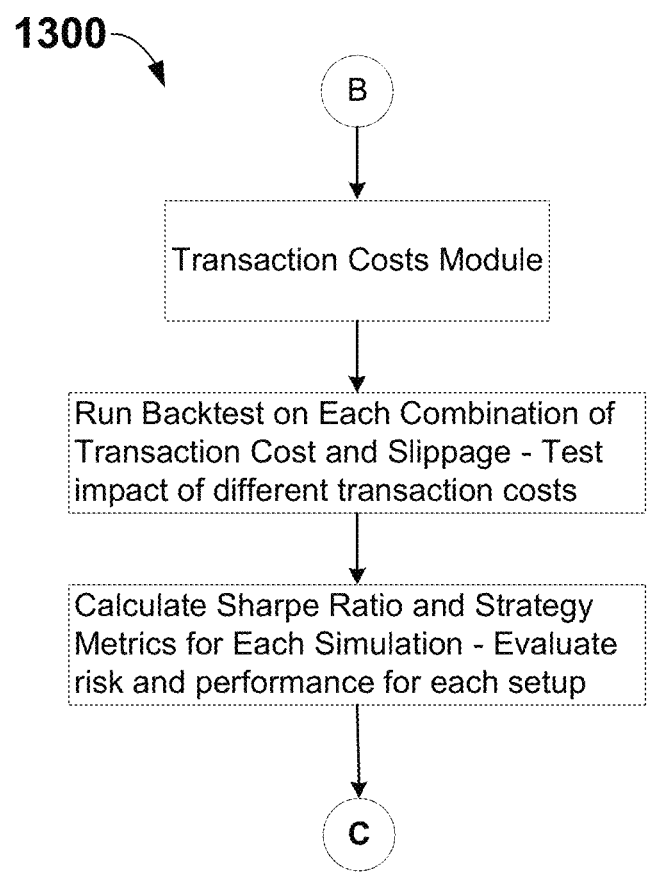
FIG. 13 is an illustration of an exemplary flowchart of a Transaction Costs Module process, in accordance with an embodiment of the present invention.

FIG. 13 is an illustration of an exemplary flowchart of a Transaction Costs Module (764) process 1300, in accordance with an embodiment of the present invention.

Figure 14:
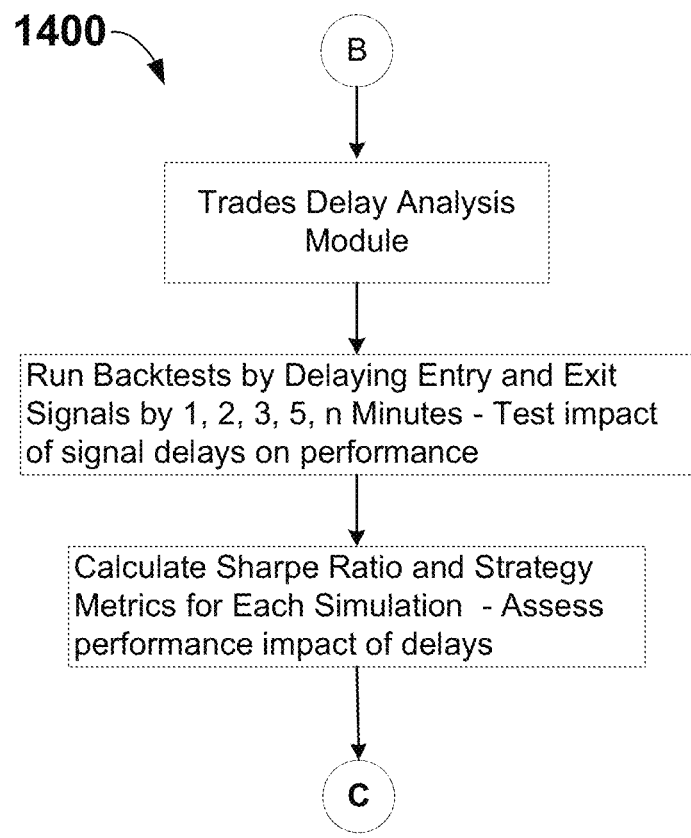
FIG. 14 is an illustration of an exemplary flowchart of a Trades Delay Analysis Module acts, in accordance with an embodiment of the present invention.

FIG. 14 is an illustration of an exemplary flowchart of a Trades Delay Analysis Module (766) acts 1400, in accordance with an embodiment of the present invention.

Figure 15:
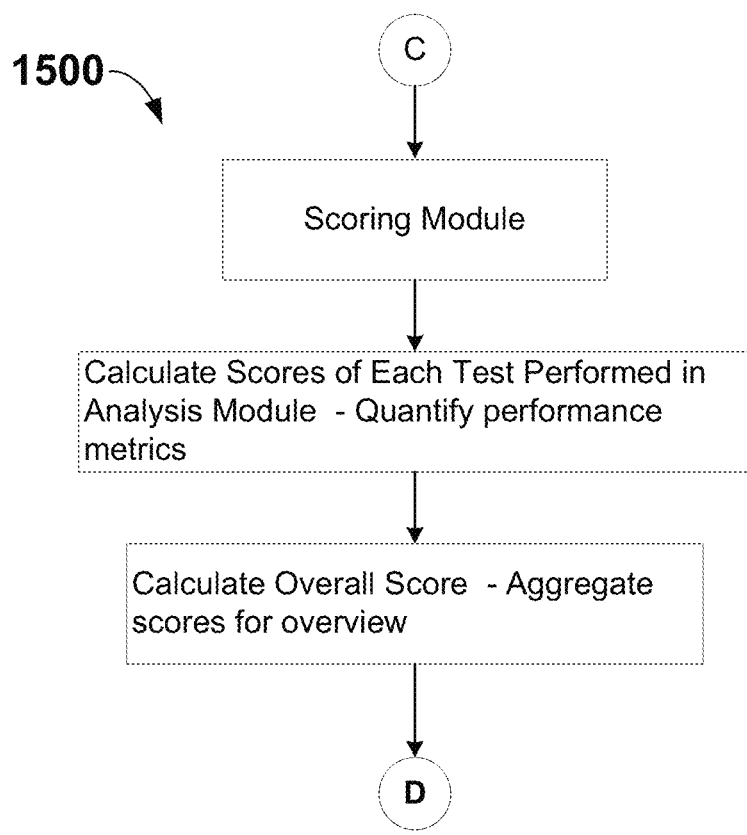
FIG. 15 is an illustration of an exemplary flowchart of a Scoring Module operation, in accordance with an embodiment of the present invention.

FIG. 15 is an illustration of an exemplary flowchart of a Scoring Module (768) operation 1500, in accordance with an embodiment of the present invention.

Figure 16:
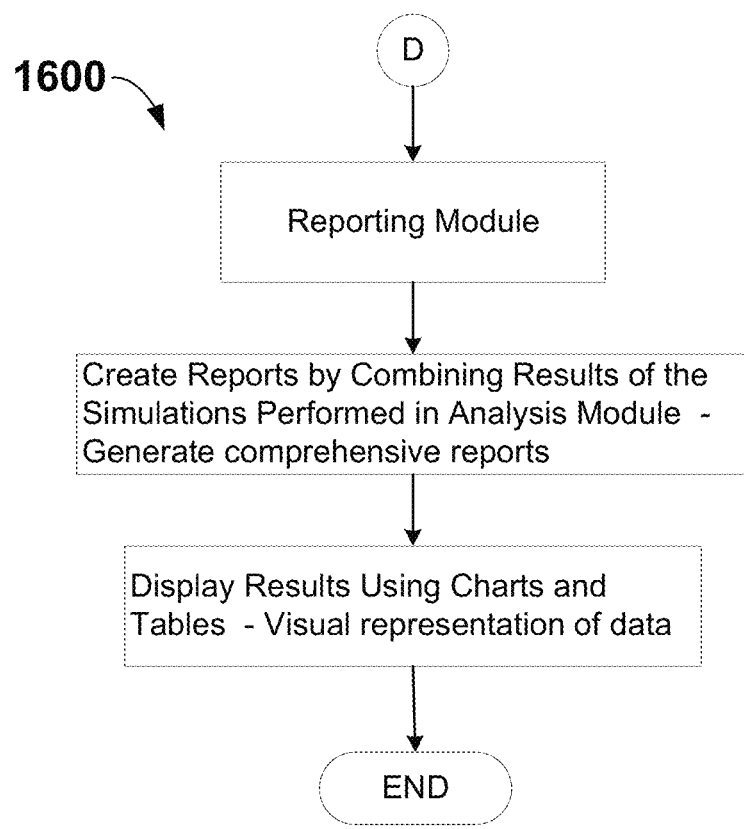
FIG. 16 is an illustration of an exemplary flowchart of a Reporting Module activity, in accordance with an embodiment of the present invention.

FIG. 16 is an illustration of an exemplary flowchart of a Reporting Module (770) activity 1600, in accordance with an embodiment of the present invention.

Figure 17:
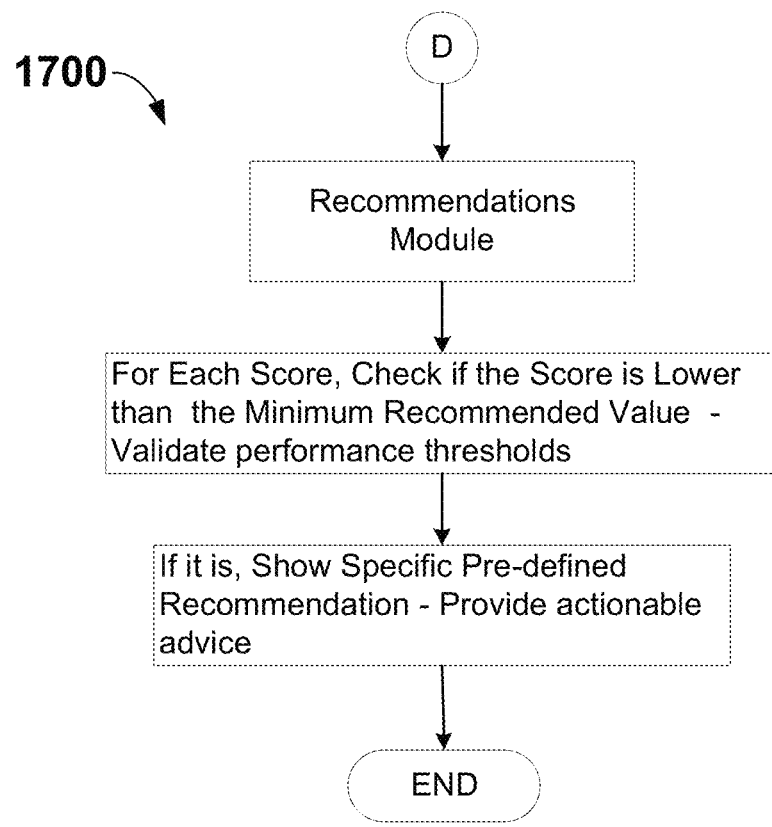
FIG. 17 is an illustration of an exemplary flowchart of a Recommendations Module proceeding, in accordance with an embodiment of the present invention.

FIG. 17 is an illustration of an exemplary flowchart of a Recommendations Module (772) proceeding 1700, in accordance with an embodiment of the present invention.

It is noted that according to USA law, all claims must be set forth as a coherent, cooperating set of limitations that work in functional combination to achieve a useful result as a whole. Accordingly, for any claim having functional limitations interpreted under 35 USC § 112 (6)/(f) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6)/(f) is/(are) dependent on one or more remote servers located outside the USA, it is intended that each such recited function under 35 USC § 112 (6)/(f) is to be interpreted as the function of the local system receiving the remotely generated information required by a locally implemented claim limitation, wherein the structures and or steps which enable, and breath life into the expression of such functions claimed under 35 USC § 112 (6)/(f) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present patent application, and "35 USC § 112 (6)/(f)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112 (6) (post AIA 112 (f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) (post AIA 112 (f)) when such corresponding structures are not explicitly disclosed in the foregoing patent specification. Therefore, for any invention element(s)/structure(s) corresponding to functional claim limitation(s), in the below claims interpreted under 35 USC § 112 (6) (post AIA 112 (f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claim's construction proceedings and/or examination of patent allowability properly identify and incorporate only the portions of each of these documents discovered during the broadest interpretation search of 35 USC § 112 (6) (post AIA 112 (f)) limitation, which exist in at least one of the patents and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserves its right to later amend the present application to explicitly include citations to such documents and/or explicitly include the functionally corresponding structures which were incorporated by reference above.

Thus, for any invention element(s)/structure(s) corresponding to functional claim limitation(s), in the below claims, that are interpreted under 35 USC § 112 (6) (post AIA 112 (f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing trading strategy models according to the present invention will be apparent to those skilled in the art. Various aspects of the invention have been described above by way of illustration, and the specific embodiments disclosed are not intended to limit the invention to the particular forms disclosed. The particular implementation of the system and method for quantitative trading strategy models may vary depending upon the particular context or application. By way of example, and not limitation, the system and method for quantitative trading strategy models described in the foregoing were principally directed to trading implementations; however, similar techniques may instead be applied to other applications, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72 (b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112. sixth paragraph (pre-AIA) or 35 USC 112 (f) post-AIA. Otherwise, no limitations from the specification are to be read into any claims, unless those limitations are expressly included in the claims.

What is claimed is:

1. A method, executed by one or more computer processors, comprising the steps of:
    receiving data, wherein said data including historical prices, volumes, and trading strategy model parameters;
    executing, with an analysis module, at least one of an analysis, performance testing and scoring of the trading strategy model's process;
    performing, with a Strategy Stats Calculation Module, a series of trading strategy model calculations including a Sharpe ratio score calculation that compares performances of different trading strategy models;
    analyzing, with an All-Parameters Analysis Module, the performance of the trading strategy model by running different combinations of the trading strategy model parameters;
    detecting overfitting;
    implementing, with an Analysis Data Connector, a distribution of said input data to said analysis, Strategy Stats Calculation, and/or All-Parameters Analysis modules;
    calculating, for each of a predetermined learning time periods, the difference between the Sharpe ratio of the trading strategy using default parameters and the trading strategy using learnt parameters;
    wherein determining the learnt parameters comprises:
        selecting one of more parameters with best score(s);
        calculating the score(s) by subtracting the calculated Sharpe ratio of the strategy using the default parameters with the learnt parameters;
        receiving indication if the trading strategy as unstable and unable to learn, at least in part, based on if the difference in the Sharpe Ratio is greater than a predetermined threshold;
        changing value(s) of indicator parameter(s) of at least one trading strategy towards increasing the stability of the trading strategy;
    calculating, with an Output Module, a score of an overall performance of the trading strategy model, at least in part, based on the changed values of influential indicator parameters and by normalizing single scores and combining the single scores into groups;
    implementing, with an output data connector, a distribution of at least one of, score calculations, analysis data, and recommendations to said output module; and,
    communicating a recommendation based, at least in part, upon any of the calculation step(s).

2. The method of claim 1, further comprising responding to changes in the trading strategy model's input parameters determined by a sensitivity analysis routine.

3. The method of claim 2, further comprising exhibiting significant changes in performance for small changes in the trading strategy model's input parameters, whereas a trading strategy model with a low parameter sensitivity is relatively stable for small changes in input parameters.

4. The method of claim 1, further comprising annualizing volatility calculations where:

a high annualized volatility value is an indicator of significant movements in the profit and loss of the trading strategy model; and a low volatility is an indicator of stable movements in the performance of the trading strategy model.

5. The method of claim 1, further comprising determining a return over maximum drawdown calculations, which is a measure of a reward of the trading strategy where the maximum drawdown comprises a risk metric that measures a largest peak-to-trough decline in the value of the trading strategy model and the drawdown indicates most significant loss the trading strategy model have experienced.

6. The method of claim 1, further comprising determining a return over commission costs calculations where a low return over commission costs is an indicator of low/bad performance and a recommendation is presented to trade less frequently.

7. The method of claim 1, further comprising calculating traded percentage wherein, when a traded percentage value is less than (<) roughly a preset threshold value, a recommendation is presented to review the indicator parameters so that the strategy would trade more frequently.

8. The method of claim 1, further comprising determining winning percentage that measures number of days in which the trading strategy was profitable over the total number of days in which the trading strategy has been simulated.

9. The method of claim 1, further comprising discerning years traded, wherein said years traded is configured to indicate whether the trading strategy model is statistically significant, wherein the years traded is the number of years that the trading strategy model is tested.

10. The method of claim 1, further comprising:
optimizing, with an Analysis of Individual Parameters Module, the trading strategy model; and
focusing on the most influential parameters that have a significant impact on the performance of the trading strategy model.

11. The method of claim 1, further comprising analyzing, with a Transaction Costs Module, a sensitivity of the trading strategy model to changes in the commission costs and a slippage cost of the strategy model.

12. The method of claim 1, further comprising measuring, with a Trades Delay Module, a degradation in the performance of the trading strategy model due to some delay in sending orders.

13. The method of claim 1, further comprising presenting, with a scoring module, the scores of related strategies.

14. The method of claim 1, further comprising bestowing, with a reporting module, information about analysis, performance testing and/or scoring of said trading strategy model.

15. The method of claim 14, further comprising revealing, with a recommendation module, suggestions on how to improve said trading strategy model's process.

16. A system comprising:
an input module, wherein said input module comprises at least one input data including historical prices, volumes, and trading strategy model parameters;
an analysis module, said analysis module is configured to be operable for executing analysis, performance testing and/or scoring of the trading strategy model's process, wherein said analysis module comprise:
a Strategy Stats Calculation Module, wherein said Strategy Stats Calculation Module is configured to perform a series of trading strategy model calculations including a Sharpe ratio score calculation that compares performances of different trading strategy models by considering returns and risks including measuring an excess return per unit of risk of the different trading strategy models;
an Analysis Data Connector, wherein said analysis data connector is configured to implement a distribution of said input data to said analysis, performance testing, and/or scoring modules;
an Output Module, said output module is configured for calculating a score of an overall performance of the trading strategy model, at least in part, based on the changed values of influential indicator parameters and by normalizing single scores and combining the single scores into groups;
an output data connector that is configured to implement a distribution at least one of, score calculations, analysis data, and recommendations to said output module;
and, wherein said all-parameters analysis module further comprises an adaptability analysis routine where a score may be calculated for each of a predetermined learning time periods as the difference between the Sharpe ratio of the trading strategy using default parameters and the trading strategy using learnt parameters;
wherein determining the learnt parameters comprises:
selecting one or more parameters with best score(s);
calculating the score(s) by subtracting the calculated Sharpe ratio of the strategy using the default parameters with the learnt parameters;
receiving indication if the trading strategy as unstable and unable to learn, at least in part, based on if the difference in the Sharpe Ratio is greater than a predetermined threshold;
changing value(s) of indicator parameter(s) of at least one trading strategy towards increasing the stability of the trading strategy;
and, said system being further configured to communicate a recommendation based at least in part, upon the results from any of the system calculation(s) performed.

17. A non-transitory computer-readable storage medium with executable computer instructions stored thereon, wherein the instructions instruct one or more processors to perform the steps comprising of:
receiving input data, wherein said input data including historical prices, volumes, and trading strategy model parameters;
executing at least one of an analysis, performance testing and scoring of the trading strategy model's process;
detecting overfitting;
calculating, with an Output Module, a score of an overall performance of the trading strategy model, at least in part, based on the changed values of influential indicator parameters and by normalizing single scores and combining the single scores into groups;
calculating, for each of a predetermined learning time periods, the difference between the Sharpe ratio of the trading strategy using default parameters and the trading strategy using learnt parameters;
wherein determining the learnt parameters comprises:
selecting one of more parameters with best score(s);
calculating the score(s) by subtracting the calculated Sharpe ratio of the strategy using the default parameters with the learnt parameters;
receiving indication if the trading strategy as unstable and unable to learn, at least in part, based on if the difference in the Sharpe Ratio is greater than a predetermined threshold;

changing value(s) of indicator parameter(s) of at least one trading strategy towards increasing the stability of the trading strategy;
implementing a distribution at least one of, score calculations, analysis data, and recommendations to said an output module; and
communicating a recommendation, at least in part upon any of the calculation step(s).

* * * * *